United States Patent
Stoicescu et al.

(10) Patent No.: US 12,204,724 B2
(45) Date of Patent: Jan. 21, 2025

(54) WATER DROPLET REJECTION FOR CAPACITIVE MICROMACHINED ULTRASONIC TRANSDUCER (CMUT) TOUCH SENSING BASED ON SPATIAL DISTRIBUTION OF CMUT RECEIVERS

(71) Applicant: Infineon Technologies AG, Neubiberg (DE)

(72) Inventors: Emanuel Stoicescu, Bucharest (RO); Erhard Landgraf, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/164,152

(22) Filed: Feb. 3, 2023

(65) Prior Publication Data

US 2024/0264703 A1 Aug. 8, 2024

(51) Int. Cl.
*G06F 3/043* (2006.01)
*B06B 3/04* (2006.01)
*G06F 3/041* (2006.01)

(52) U.S. Cl.
CPC .............. *G06F 3/0433* (2013.01); *B06B 3/04* (2013.01); *G06F 3/0418* (2013.01); *B06B 2201/40* (2013.01)

(58) Field of Classification Search
CPC ........ G06F 3/0418; G06F 3/041; G06F 3/044; G06F 3/0436
See application file for complete search history.

(56) References Cited

U.S. PATENT DOCUMENTS

| | | | | |
|---|---|---|---|---|
| 6,628,270 | B2* | 9/2003 | Sekiguchi | G06V 30/228 345/173 |
| 7,570,252 | B2* | 8/2009 | Fujiwara | G06F 3/03545 345/173 |
| 7,856,883 | B2* | 12/2010 | Chang | G06F 3/043 73/598 |
| 9,990,089 | B2* | 6/2018 | Dickinson | G01S 15/02 |
| 11,347,355 | B2* | 5/2022 | Khajeh | G06F 3/0436 |
| 11,698,701 | B1* | 7/2023 | Stoicescu | G06F 3/0436 345/177 |
| 11,934,617 | B1* | 3/2024 | Stoicescu | G06F 3/0436 |
| 2002/0060665 | A1* | 5/2002 | Sekiguchi | G06F 3/0346 345/157 |
| 2004/0246239 | A1* | 12/2004 | Knowles | H01H 13/83 345/173 |
| 2009/0235750 | A1* | 9/2009 | Chang | G06F 3/043 73/627 |

(Continued)

*Primary Examiner* — Olga V Merkoulova
(74) *Attorney, Agent, or Firm* — Harrity & Harrity, LLP

(57) ABSTRACT

An ultrasonic touch sensor includes a touch structure configured to receive a touch; a transmitter arrangement configured to transmit one or more ultrasonic transmit waves toward the touch structure; a receiver arrangement configured to receive ultrasonic reflected waves produced by reflections of the one or more ultrasonic transmit waves and generate a plurality of measurement signals representative of the ultrasonic reflected waves; and a measurement circuit configured to measure a degree of variation of a plurality of measurement signals, compare the degree of variation with a detection threshold, and determine whether a no-touch event or a touch event has occurred at the touch structure based on whether the degree of variation satisfies the detection threshold.

24 Claims, 7 Drawing Sheets

(56) References Cited

U.S. PATENT DOCUMENTS

| | | | |
|---|---|---|---|
| 2015/0016223 A1* | 1/2015 | Dickinson | G06F 3/043 |
| | | | 367/87 |
| 2016/0345113 A1* | 11/2016 | Lee | G01S 15/04 |
| 2018/0032211 A1* | 2/2018 | King | G06F 3/04186 |
| 2018/0341359 A1* | 11/2018 | Khajeh | G06F 3/0436 |
| 2018/0373393 A1* | 12/2018 | Lerner | G06F 3/0488 |
| 2020/0413202 A1* | 12/2020 | Kusano | H04R 31/00 |
| 2021/0405809 A1* | 12/2021 | Khajeh | G06F 3/04182 |
| 2023/0062377 A1* | 3/2023 | Steiner | G06F 3/03547 |

* cited by examiner

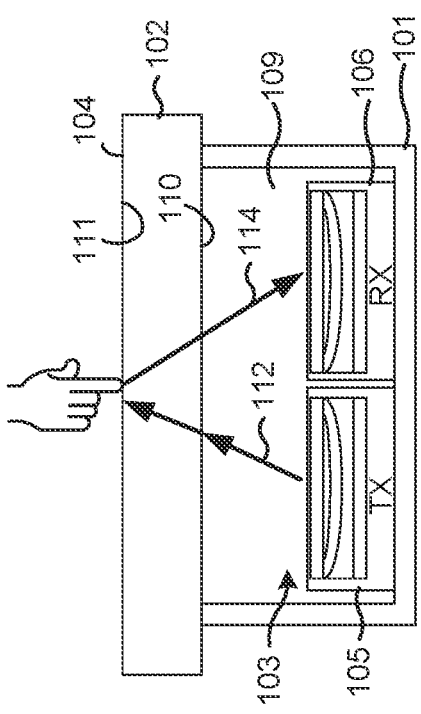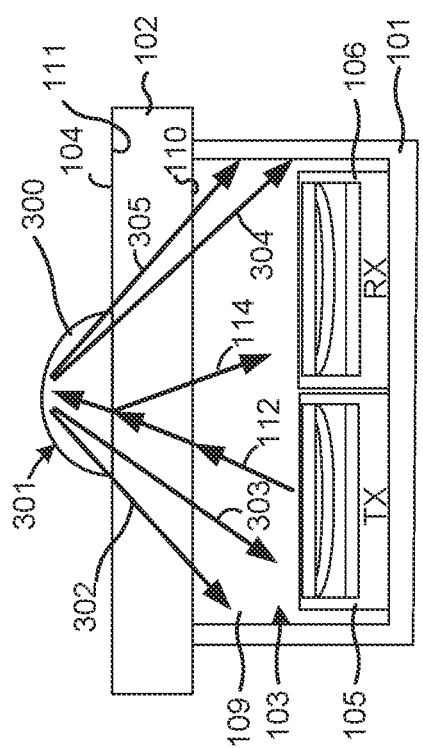

WATER DROPLET REJECTION FOR CAPACITIVE MICROMACHINED ULTRASONIC TRANSDUCER (CMUT) TOUCH SENSING BASED ON SPATIAL DISTRIBUTION OF CMUT RECEIVERS

BACKGROUND

Touch sensing through metal surfaces using ultrasound waves is currently being investigated as an alternative to capacitive touch sensing. Ultrasonic sensing relies on a transmission of an ultrasound wave directed at a touch structure and a reception and processing of a reflected waveform that is reflected back from the touch structure. A characteristic of the reflected waveform will depend on an existence or a non-existence of a touch event and can be used to discriminate between the existence or the non-existence of the touch event.

SUMMARY

In some implementations, an ultrasonic touch sensor includes a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate a first excitation signal for producing a first ultrasonic transmit wave and a second excitation signal for producing a second ultrasonic transmit wave; a first ultrasonic transmitter arranged within the ultrasound chamber, wherein the first ultrasonic transmitter is configured to receive the first excitation signal and transmit the first ultrasonic transmit wave toward the touch structure based on the first excitation signal; a second ultrasonic transmitter arranged within the ultrasound chamber, wherein the second ultrasonic transmitter is configured to receive the second excitation signal and transmit the second ultrasonic transmit wave toward the touch structure based on the second excitation signal; a first ultrasonic receiver arranged within the ultrasound chamber, wherein the first ultrasonic receiver is configured to receive a first ultrasonic reflected wave produced by a reflection of the first ultrasonic transmit wave and generate a first measurement signal representative of the first ultrasonic reflected wave; a second ultrasonic receiver arranged within the ultrasound chamber, wherein the second ultrasonic receiver is configured to receive a second ultrasonic reflected wave produced by a reflection of the second ultrasonic transmit wave and generate a second measurement signal representative of the second ultrasonic reflected wave; and a measurement circuit coupled to the first ultrasonic receiver and the second ultrasonic receiver, wherein the measurement circuit is configured to measure a difference between the first measurement signal and the second measurement signal, perform a comparison based on the difference and a first detection threshold, and determine whether a no-touch event or a touch event has occurred at the touch surface based on whether the difference satisfies the first detection threshold.

In some implementations, an ultrasonic touch sensor includes a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; an ultrasonic transmitter arranged within the ultrasound chamber, wherein the ultrasonic transmitter is configured to receive the excitation signal and transmit the ultrasonic transmit wave toward the touch structure based on the excitation signal; a plurality of ultrasonic receivers arranged within the ultrasound chamber, wherein the plurality of ultrasonic receivers are configured to receive a plurality of reflections of the ultrasonic transmit wave and generate a plurality of measurement signals representative of the plurality of reflections, wherein each ultrasonic receiver of the plurality of ultrasonic receivers is configured to generate a respective measurement signal of the plurality of measurement signals; and a measurement circuit coupled to the plurality of ultrasonic receivers, wherein the measurement circuit is configured to measure a degree of variation of the plurality of measurement signals, compare the degree of variation with a first detection threshold, and determine whether a no-touch event or a touch event has occurred at the touch surface based on whether the degree of variation satisfies the first detection threshold.

In some implementations, a method includes transmitting, by an ultrasonic transmitter, an ultrasonic transmit wave toward a touch structure of an ultrasonic touch sensor; receiving, by a plurality of ultrasonic receivers, a plurality of reflections of the ultrasonic transmit wave; generating, by the plurality of ultrasonic receivers, a plurality of measurement signals representative of the plurality of reflections; measuring, by a measurement circuit, a degree of variation of the plurality of measurement signals; comparing, by the measurement circuit, the degree of variation with a detection threshold; and determining, by the measurement circuit, whether a no-touch event or a touch event has occurred at the touch surface based on whether the degree of variation satisfies the detection threshold.

BRIEF DESCRIPTION OF THE DRAWINGS

Implementations are described herein with reference to the appended drawings.

FIGS. 3A and 3B illustrate operation principles of an ultrasonic touch sensor according to one or more implementations.

DETAILED DESCRIPTION

Figure 1:
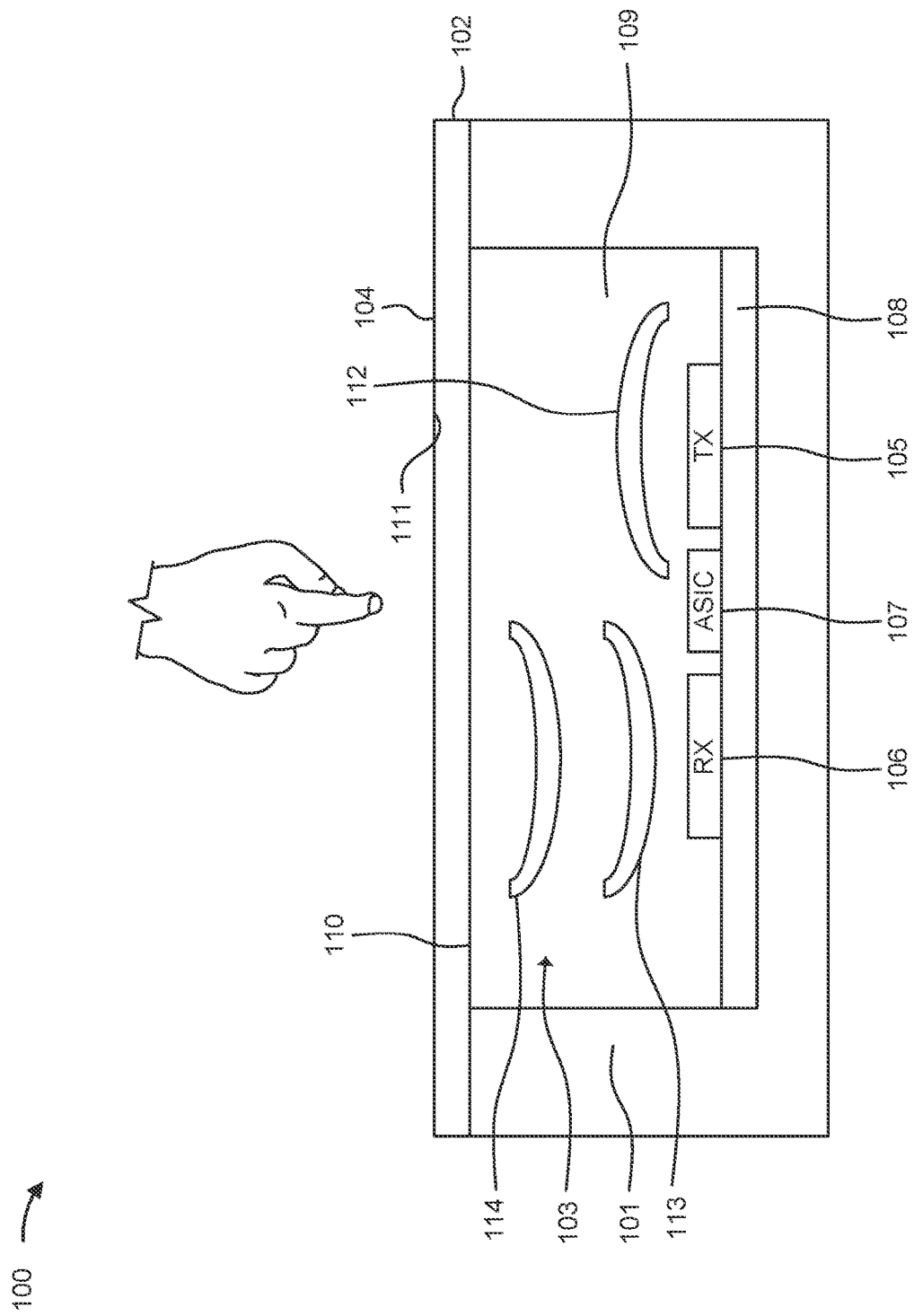
FIG. 1 illustrates an ultrasonic touch sensor according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

"Sensor" may refer to a component which converts a property to be measured to an electrical signal (e.g., a current signal or a voltage signal). The property to be measured may, for example, comprise a magnetic field, an electric field, an electromagnetic wave (e.g., a radio wave), a pressure, a force, a current, or a voltage, but is not limited thereto. For a capacitive touch sensor, the property to be measured is a capacitance that is detected directly from a user making skin contact with a touch structure. For example, a conductive material may be coated on a non-touch side of the touch structure and a capacitor may be formed within the touch structure (e.g., between the conductive material disposed on the non-touch side and a touch side) when skin contact is made to the touch side of the touch structure. The capacitive touch sensor may measure a capacitance within the touch structure and detect changes in the capacitance for detecting touches. However, capacitive touch sensors are prone to false signals (e.g., false touch detections) and cannot operate reliably, if at all, when the touch surface is exposed to water. Thus, there is an interruption in touch detection functionality when the capacitive touch sensor is wet. Because the capacitive touch sensor cannot operate correctly in a reliable manner when the touch surface is wet, a user is not able to properly interact with the capacitive touch sensor when the touch surface is wet.

For an ultrasonic touch sensor, the property to be measured is an ultrasound wave produced, for example, by a microelectromechanical system (MEMS) transducer. The ultrasound wave may be directed at a touch structure where the ultrasound wave is reflected back by the touch structure as a reflected ultrasound wave. The reflected ultrasound wave can be used for sensing touch (e.g., a touch event) at a touch surface of the touch structure. Specifically, the ultrasonic touch sensor can use the reflected ultrasound wave to discriminate between an existence of the touch event or a non-existence of the touch event (e.g., a no-touch event).

When the touch surface is dry, a touch at the touch surface may result in an equal or substantially equal distribution of reflected ultrasound waves that can be used for detecting the touch event. In other words, a spatial distribution of the reflected ultrasound waves is substantially homogeneous and a degree of variation in the reflected ultrasound waves (e.g., in the spatial distribution) is low. For example, the reflected ultrasound waves that are reflected at the touch surface during the touch event may be substantially equal in reflection angle and/or amplitude (e.g., substantially equal in reflected energy).

A liquid droplet present on the touch surface creates an additional liquid-air interface (e.g., a water-air interface) that may cause backscattering of a transmitted ultrasound wave. The liquid-air interface may be curved due to the nature of a typical shape of a liquid droplet. A curvature of the liquid-air interface may cause a change in a spatial distribution of reflected ultrasound waves. For example, a reflection from the liquid-air interface may travel in a different direction and angle than a reflection from the touch surface that is typically flat. Due to the curvature of the liquid-air interface, the liquid-air interface may cause multiple ultrasound wave reflections with an irregular spatial distribution. In other words, the spatial distribution of the reflected ultrasound waves from the liquid-air interface is substantially inhomogeneous and a degree of variation in the reflected ultrasound waves (e.g., in the spatial distribution) is increased compared to those reflections generated by a dry touch surface. For example, the reflected ultrasound waves that are reflected at the liquid-air interface may be unequal in reflection angle and/or amplitude (e.g., unequal in reflected energy).

Moreover, a geometry of the liquid-air interface (e.g., the curvature of the liquid-air interface) is generally unstable and may be susceptible to movement of the ultrasonic touch sensor in free space. Thus, the spatial distribution of the reflected ultrasound waves from the liquid-air interface may change from measurement to measurement. This change in spatial distribution may increase the degree of variation in the reflected ultrasound waves from measurement to measurement.

Moreover, reflected ultrasound waves generated while one or more liquid droplets are present on the touch surface interface may cause false touch detections. For example, a liquid droplet may cause a damping effect imparted onto reflections generated at the touch surface (e.g., at a touch surface to liquid interface), which may mimic a damping effect caused by a touch at the touch surface. Thus, a damped or weaker reflection from the touch surface-liquid interface during a no-touch event may be misinterpreted by the ultrasonic touch sensor as a damped or weaker reflection caused by a touch at a dry touch surface. In other words, a liquid droplet wave signature may not be distinguishable from a finger touch wave signature and may result in false or erroneous touch detections.

Some implementations disclosed herein are directed to using an ultrasonic touch sensor to discriminate between touch and no touch events when one or more liquid droplets may be present on a touch surface of the ultrasonic touch sensor. The ultrasonic touch sensor may use one or more ultrasonic measurements to analyze a degree of variation in reflected ultrasound waves. In other words, the ultrasonic touch sensor may be configured to monitor for changes in a spatial distribution of reflected ultrasound waves. The ultrasonic touch sensor may be configured to reject a touch detection as a false touch detection if the degree of variation exceeds a threshold (e.g., if the degree of variation is high), indicating a nonuniform spatial distribution of reflected ultrasound waves. For example, the false touch detection may be caused by a presence of one or more liquid droplets on the touch surface. In a case in which a false touch detection is determined, the ultrasonic touch sensor may output a no-touch decision as a final measurement result. In contrast, the ultrasonic touch sensor may be configured to confirm a touch detection as a true touch detection if the degree of variation does not exceed a threshold (e.g., if the degree of variation is low) indicating a substantially uniform spatial distribution of reflected ultrasound waves. Thus, the ultrasonic touch sensor may be capable of making more reliable touch/no-touch decisions and avoiding false touch detections, even when one or more liquid droplets are present on the touch surface.

FIG. 1 illustrates an ultrasonic touch sensor 100 according to one or more implementations. The ultrasonic touch sensor 100 includes a housing comprising a frame 101 and a touch structure 102 (e.g., a touch substrate) that form an ultrasound chamber 103. The frame 101 may be made of an encapsulant, such as overmolded thermoplastic or another type of molding material. As part of the housing, the frame 101 may have a recess that becomes the ultrasound chamber 103 when the touch structure 102 encloses the recess. In some implementations, part of the frame 101 may extend into and fill the ultrasound chamber 103, thereby covering one or more sensor components arranged therein. Epoxy or some other ultrasound-compatible material cast in the recess may be used. Accordingly, an area of the housing in which ultrasonic transducers reside may be referred to as an acoustic port, an ultrasound port, an acoustic chamber, or an ultrasound chamber, among other examples.

In either case, the touch structure 102 is used as a lid or a package cover that rests upon a touch side of the ultrasonic touch sensor 100. In the example shown, the ultrasound chamber 103 is a chamber that is formed by the enclosure of the frame 101 and the touch structure 102. The touch structure 102 may be made of one or more metal layers, one or more plastic layers, and/or one or more layers made out of another solid material. The touch structure 102 includes a touch surface 104 at its external interface with an environment. The touch surface 104 is arranged and operable to receive contact (e.g., touches) from a user that can be detected by sensor circuitry.

In some implementations, lateral sides of the frame 101 may be at least partially open such that the ultrasound chamber 103 is not a fully enclosed volume. For example, the lateral sides of the frame 101 may include columns that support the touch structure 102 and/or the touch structure 102 may be supported by a coupling medium. For example, the coupling medium, such as a film layer, a silicone gel, or a soft epoxy, may be provided in the ultrasound chamber 103 and may be mechanically coupled to and between a circuit substrate at a bottom side of the ultrasound chamber 103 and the touch structure 102 at a top side of the ultrasound chamber 103 to provide support to the touch structure 102. In some implementations, the lateral sides of the ultrasound chamber 103 may be fully open, with the lateral sides of the frame 101 being absent, and the touch structure 102 may be partially or fully supported by the coupling medium. Thus, the coupling medium may be sufficiently rigid to support the touch structure 102 in cases which the lateral sides of the ultrasound chamber 103 are fully open.

The ultrasound chamber 103 contains the sensor circuitry used for detecting no-touch events and touch events at the touch surface 104. A touch event is an instance when the user makes contact with the touch surface 104, and a no-touch event is any other circumstance, including the occurrence of disturbing influences (e.g., error sources) that may occur in the absence of a touch event. The sensor circuitry is configured to distinguish between a touch event and a no-touch event, taking into account possible errors originating from the disturbing influences.

An ultrasound wave is a sound wave having a frequency of 20 kHz or higher. An ultrasound wave may be referred to as an ultrasonic transmit wave when the ultrasound wave is transmitted by a transmitter, and may be referred to as an ultrasonic reflected wave when the ultrasound wave has been reflected by the touch structure 102 for reception at a receiver. The sensor circuitry includes a transmitter (TX) 105 configured to transmit ultrasound waves (e.g., ultrasonic transmit waves), a receiver (RX) 106 configured to receive reflected ultrasound waves (e.g., ultrasonic reflected waves), and a sensor circuit 107 (e.g., an application specific integrated circuit (ASIC)). The sensor circuit 107 may be configured to generate the ultrasound waves for transmission by the transmitter 105, and perform signal processing on the reflected ultrasound waves received by the receiver 106. In some implementations, the sensor circuit 107 may be configured to evaluate the reflected ultrasound waves for detecting no-touch events and touch events by applying a first touch detection algorithm, and control one or more components of the ultrasonic touch sensor 100, including the transmitter 105, the receiver 106, or any signal processing components of a signal processing chain of the sensor circuit 107. In some implementations, the sensor circuit 107 may evaluate an additional property of the ultrasonic touch sensor 100 (e.g., an internal pressure, a bias voltage, or a cross-coupling effect) from which a measurement signal is obtained and evaluated for detecting the no-touch events and the touch events by applying a second touch detection algorithm. In some implementations, both the first touch detection algorithm and the second touch detection algorithm may be used in combination for detecting the no-touch events and the touch events.

The transmitter 105 and the receiver 106 may both be sound transducers with a flexible membrane that vibrates to either produce sound waves, in the case of the transmitter 105, or in response to receiving sound waves, in the case of the receiver 106. In particular, the transmitter 105 and the receiver 106 may be capacitive micromachined ultrasonic transducers (CMUTs). In some implementations, the transmitter 105 and the receiver 106 may be combined into a single transceiver transducer that has a single flexible membrane.

A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The first electrode and the second electrode of the capacitor are biased with a bias voltage (e.g., a DC bias voltage) that establishes an initial operating condition of the MEMS transducer. Accordingly, the first electrode and the second electrode of the capacitor may be referred to as biased electrodes.

When an AC signal is applied across the biased electrodes of the capacitor, the AC signal is superimposed onto the bias voltage. As a result, the flexible membrane will vibrate and produce ultrasound waves in a medium of interest. In this way, the CMUT works as a transmitter. The sensor circuit 107 is configured to generate an excitation signal and transmit the excitation signal to the transmitter 105. The excitation signal is applied across the biased electrodes, causing the flexible membrane to vibrate according to the waveform of the excitation signal and producing a corresponding ultrasound wave. Different excitation signals induce different ultrasound waves. Accordingly, the excitation signal is a signal applied to the transmitter 105 by the sensor circuit 107 to produce an ultrasound wave that is used to detect touch events at the touch surface 104 of the touch structure 102 as well as the applied force thereof. Thus, the sensor circuit 107 may include a signal generator that is configured to generate an excitation signal for producing an ultrasonic wave. The transmitter 105 is configured to receive the excitation signal from the signal generator and transmit the ultrasonic wave based on the excitation signal.

On the other hand, when an ultrasound wave is applied to (e.g., received by) the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

The transmitter 105, the receiver 106, and the sensor circuit 107 may be arranged on a common circuit substrate 108 (e.g., a printed circuit board (PCB)) that is disposed at a base of the frame 101. The common circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the ultrasound chamber 103 may be filled with a coupling medium 109, such as a silicone gel, a soft epoxy, a liquid, or any other material that enables the propagation of ultrasonic waves with no, or substantially no, attenuation. Thus, the coupling medium 109 may provide acoustic (e.g., ultrasound) coupling between the transmitter 105 and the receiver 106 with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. When providing mechanical coupling between the touch structure 102 and the receiver 106, the coupling medium 109 is a non-gaseous medium. In some implementations, the coupling medium 109 may provide structural support to the touch structure 102 (e.g., in instances when the lateral sides of the ultrasound chamber 103 are fully open).

The touch structure 102 has a first interface 110 and a second interface 111 that interacts with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 toward the touch structure 102 (e.g., at the first interface 110 and the second interface 111). The first interface 110 and the second interface 111 are configured to reflect the ultrasonic transmit wave 112 back into the ultrasound chamber 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113, and the second interface 111 reflects the ultrasonic transmit wave 112 by internal reflection to produce the ultrasonic reflected wave 114. Since the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received, and the sensor circuit 107 may obtain a first measurement signal from the continuous measurement signal in a first observation window corresponding to the ultrasonic reflected wave 113 and may obtain a second measurement signal from the continuous measurement signal in a second observation window corresponding to the ultrasonic reflected wave 114. Thus, the first measurement signal and the second measurement signal may be different portions of the continuous measurement signal output by the receiver 106. As described in greater detail below, a waveform of the ultrasonic reflected wave 114 may be particularly useful to the sensor circuit 107 for making a touch/no-touch decision because the ultrasonic reflected wave 114 is more sensitive to touches occurring at the second interface 111 (e.g., the touch interface).

Additionally, a timing difference between reception times of the ultrasonic reflected waves 113 and 114 can also be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 occurs when the touch surface 104 is touched by, for example, a finger of the user (e.g., a direct touch with skin making direct contact with the touch surface 104). The change in the ultrasonic reflected wave 114 can be detected or used at a receiver side of the ultrasonic touch sensor 100 for detecting the touch event or the no-touch event, as well as for determining touch location and touch force. Specifically, the touch event at the touch surface 104 may cause a damping effect where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The waveform of the ultrasonic reflected wave 114 during the no-touch event may be used by the sensor circuit 107 as a reference waveform for a touch/no-touch determination. For example, when the waveform of the ultrasonic reflected wave 114 remains similar to the reference waveform, the ultrasonic reflected wave 114 may correspond to a no-touch event. Alternatively, when a difference between the waveform of the ultrasonic reflected wave 114 and the reference waveform satisfies a threshold (e.g., the difference is greater than the threshold, the difference is greater than or equal to the threshold, or the difference satisfies another threshold condition), the ultrasonic reflected wave 114 may correspond to a touch event.

In some implementations, the signal amplitude of the ultrasonic reflected wave 114 during the no-touch event may be used by the sensor circuit 107 as a reference level for the touch/no-touch determination. The sensor circuit 107 may measure the signal amplitude of the ultrasonic reflected wave 114 and compare the signal amplitude and the reference level for the touch/no-touch determination. If a difference between the signal amplitude of the ultrasonic reflected wave 114 and the reference level satisfies a threshold (e.g., the difference is greater than the threshold, the difference is greater than or equal to the threshold, or the difference satisfies another threshold condition), the ultrasonic reflected wave 114 may correspond to a touch event. Therefore, a property of the ultrasonic reflected wave 114 may depend on the existence or the non-existence of the touch event. The property of the reflected ultrasonic sound wave can be measured at the sensor circuit 107 to discriminate between a presence of the touch event or the no-touch event.

Meanwhile, the acoustic impedance change resulting from the touch event may be minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104.

During operation of the ultrasonic touch sensor 100, the sensor circuit 107 is configured to apply a touch detection algorithm to distinguish between the touch event and the no-touch event. The touch detection algorithm may take into account or be insensitive to various disturbances, including electrical and ultrasonic cross-talk, multipath propagation, noise, temperature, and/or environmental disturbances (such as dirt or water) on the touch surface 104. The touch detection algorithm may take into account or be insensitive to various calibration factors, including different touch surfaces, variations in mounting, non-linear behaviors, large offsets, and drifting effects.

In some implementations, the sensor circuit 107 may be configured to generate a first plurality of digital samples from a first signal (e.g., a reference measurement signal) generated by and output from the receiver 106 during a no-touch event (e.g., a reference no-touch event) during an observation window that corresponds to the ultrasonic reflected wave 114 reflected by the second interface 111. The first plurality of digital samples may represent an envelope of the first signal. The sensor circuit 107 may store the first plurality of digital samples as a plurality of reference samples in memory. In other words, the first signal corresponds to the ultrasonic reflected wave 114 received during the no-touch event and is used as a reference signal to be used for making touch/no-touch decisions during a touch monitoring operation. After obtaining and storing the plurality of reference samples, the sensor circuit 107 may be configured to generate a second plurality of digital samples from a second signal (e.g., a monitored measurement signal) generated by and output from the receiver 106 during the touch monitoring operation (e.g., during an excitation frame used for a touch/no-touch decision). The second plurality of digital samples may represent an envelope of the second signal. The sensor circuit 107 may calculate a distance (e.g., a Euclidean distance) of the second plurality of digital samples to the first plurality of digital samples (e.g., to the plurality of reference samples), and determine whether a no-touch event or a touch event has occurred at the touch surface 104 based on the distance. For example, if the distance is less than a threshold, the sensor circuit 107 may detect that a no-touch event has occurred. Alternatively, if the distance is equal to or greater than the threshold, the sensor circuit 107 may detect that a touch event has occurred.

Accordingly, the sensor circuit 107 may be configured to receive a measurement signal from the receiver 106 corresponding to the ultrasonic reflected wave 114 during the touch monitoring operation, compare the measurement signal with the reference signal to generate a comparison result (e.g., whether the measurement signal satisfies a threshold, or a defined correlation between the measurement signal and the reference signal satisfies the threshold), and determine a touch/no-touch decision based on the comparison result.

Alternatively, in some implementations, the first signal (e.g., the reference measurement signal) may be generated by and output from the receiver 106 during a touch event (e.g., a reference touch event). As a result, the plurality of reference samples may correspond to the ultrasonic reflected wave 114 received during the touch event and be stored in memory to be used by the sensor circuit 107 for making touch/no-touch decisions during the touch monitoring operation. Accordingly, in this case, if the distance calculated during the touch monitoring operation is less than a threshold, the sensor circuit 107 may detect that a touch event has occurred, and if the distance calculated during the touch monitoring operation is equal to or greater than the threshold, the sensor circuit 107 may detect that a no-touch event has occurred.

In some implementations, digital samples may be obtained from an ultrasonic reflected wave that is reflected by a different interface during the touch monitoring operation and compared with the reference signal in a similar manner as described above, including calculating a distance (e.g., a Euclidean distance) between the digital samples and reference samples of the reference signal and determining whether a no-touch event or a touch event has occurred at the touch surface based on whether or not the distance satisfies a threshold.

The touch detection algorithm may include a machine learning model that is trained to distinguish between a touch and no-touch event. Machine learning involves computers learning from data to perform tasks. Machine learning algorithms are used to train machine learning models based on sample data, known as "training data." Once trained, machine learning models may be used to make predictions, decisions, or classifications relating to new observations. The sensor circuit 107 may distinguish between a touch and no-touch event using a machine learning model. The machine learning model may include and/or may be associated with, for example, a neural network. In some implementations, the sensor circuit 107 uses the machine learning model to distinguish between a touch and no-touch event by providing candidate parameters as input to the machine learning model, and using the machine learning model to determine a likelihood, probability, or confidence that a particular outcome (e.g., that a no-touch is detected or that a touch is detected at the touch surface 104) for a subsequent touch detection operation will be determined using the candidate parameters. In some implementations, the sensor circuit 107 provides one or more measurements as input to the machine learning model, and the sensor circuit 107 uses the machine learning model to determine or identify a particular result that is most probable (for example, that a no-touch, a touch, a short touch, a long touch, a soft touch, a hard touch, a static touch, a dynamic touch (e.g., a moving touch), a direct touch (e.g., a touch made by direct skin contact with the touch surface 104), and/or an indirect touch (e.g., a touch made by non-skin contact with the touch surface 104) is present at the touch surface 104).

The sensor circuit 107 may train, update, and/or refine the machine learning model to increase the accuracies of the outcomes and/or parameters determined using the machine learning model. The sensor circuit 107 may train, update, and/or refine the machine learning model based on feedback and/or results from the subsequent touch detection operation, as well as from historical or related touch detection operations (e.g., from hundreds, thousands, or more historical or related touch detection operations) performed by the sensor circuit 107.

The touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100, the sensor circuit 107 may be configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be on the order of 25 microseconds ($\mu s$), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex.

An excitation signal may be a short signal pulse or a pulse train comprised of multiple short pulses (e.g., having a duration of about 100 nanoseconds (ns) up to about 1 $\mu s$). An excitation signal can have any shape (e.g., rectangular, sinusoidal, Gaussian, Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples, may be used for performing the direct down-conversion. Analog circuit blocks for such a down-conversion processing may include a multiplier or a diode. A low-pass filter cut-off frequency may be tuned to the bandwidth of the transmitted ultrasonic signal and the bandwidth of the transmitter 105. For example, the low-pass filter cut-off frequency may be set to 1 MHz or 2 MHz.

In some implementations, the sensor circuit 107 may include an analog-to-digital converter (ADC) that is configured to generate multiple digital samples (e.g., measurement samples) from the ultrasonic reflected waves 113 and 114 for each ultrasonic transmit wave 112 and store the digital samples in memory for evaluation. Additionally, or alternatively, in some implementations, the sensor circuit 107 may include an ADC that is configured to generate multiple digital samples from a measurement signal obtained from measuring another property of the ultrasonic touch sensor 100 (e.g., internal pressure, bias voltage, or a cross-coupling effect) and store the digital samples in memory for evaluation.

A digital processor of the sensor circuit 107 may be operable to evaluate digital samples received in an observation window using the touch detection algorithm to determine whether there is a no-touch event or a touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time required for the ultrasonic transmit wave 112 to travel from the transmitter 105, to the first interface 110, and back to the receiver 106. Likewise, a time-of-flight of a second reflection (e.g., the ultrasonic reflected wave 114) is a time required for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

As indicated above, FIG. 1 is provided merely as an example. Other examples may differ from what is described with regard to FIG. 1. For example, in some implementations, an array or transmitters, receivers, or transceivers may be provided within the ultrasound chamber 103 of the ultrasonic touch sensor 100. In some implementations, the touch structure 102 may include multiple layers resulting in more than two ultrasound reflections or echoes. In some implementations, additional circuit components may be added without deviating from the disclosure provided above.

Figure 2:
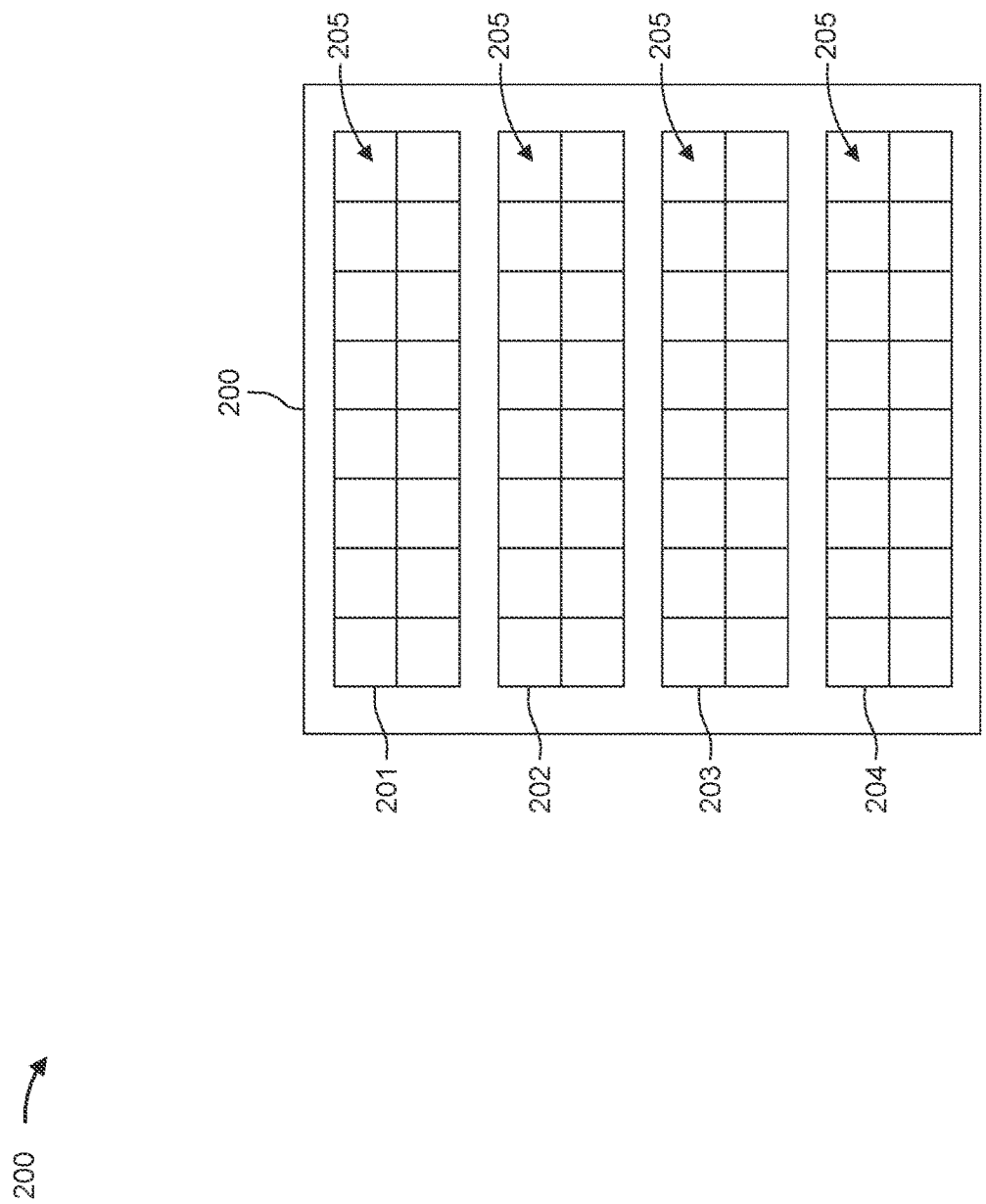
FIG. 2 illustrates a top view of an array of transceiver transducers according to one or more implementations.

FIG. 2 illustrates a top view of an array of transceiver transducers 200 according to one or more implementations. The array of transceiver transducers 200 extends in two dimensions within the ultrasound chamber 103 to cover a substantial area under the touch structure 102. The array of transceiver transducers 200 may include two or more sub-arrays 201-204 that each includes a subset of transceiver transducers 205. Individual transceiver transducers 205 of the array of transceiver transducers 200 are configurable as transmitters, receivers, or transceivers. Additionally, the individual transceiver transducers 205 of the array of transceiver transducers 200 may be individually configured into a receiving mode, a transmitting mode, or a transceiving mode on a static (e.g., fixed) basis or on a dynamic basis. As a result, the transceiver transducers 205 may be configured to provide a configuration best suited for making a touch/no-touch decision.

This configurability may be set on an individual basis (transducer-by-transducer), on a sub-array basis, or some other basis. Moreover, while the transceiver transducers 205 are shown to be substantially equal in size, the transceiver transducers 205 may vary in size. For example, the transducers of sub-array 201 may be larger than the transducers of sub-array 202. The size of an acoustic wave produced by a single transducer is proportional to the size (i.e., to the membrane area) of that transducer.

Each of the transceiver transducers 205 of the array of transceiver transducers 200 is separately controllable by the sensor circuit 107. The transceiver transducers 205 may be individually excited, alone or in combination, as transmitters and may be individually configured, alone or in combination, for receiving ultrasound waves. When one or more transceiver transducers 205 are excited, each transceiver transducer 205 produces its own ultrasonic transmit wave with acoustic aperture or beam width (e.g., proportional to the size of the membrane). If two or more transceiver transducers 205 are activated simultaneously, their respective ultrasonic transmit waves combine either constructively or deconstructively via constructive or deconstructive interference to produce a combined (superimposed or compounded) ultrasonic transmit wave that has a main directivity lobe and possibly additional side lobes. The individual wavefronts may be spherical, but the individual wavefronts may combine in front of the array of transceiver transducers 200 to create a plane wave, which is a beam of ultrasonic waves travelling in a specific direction. The transmission direction or orientation angle of the main directivity lobe is said to correspond to the traveling direction of the plane wave. When only a single transmit transducer is activated, the main directivity lobe corresponds to the individual wavefront produced by that transmit transducer.

Whether one transceiver transducer 205 is excited or multiple transceiver transducers 205 are excited, the main directivity lobe has one or more directivity characteristics that can be adjusted by a controller. Directivity characteristics of the main directivity lobe includes transmission direction, orientation angle, acoustic aperture size, beam width, or beam height, among other examples. As a result, beam sizing, beam forming, and beam steering can be realized by modulating the activation of the transceiver transducers 205 to control the directivity characteristic of the main directivity lobe by selectively generating at least one respective excitation signal. Changing the directivity characteristic of the main directivity lobe changes the area of incidence of the main directivity lobe on the first interface 110 and the second interface 111.

A receiver circuit of the sensor circuit 107 is configured to receive at least one measurement signal generated by one or more transceiver transducers and determine whether a no-touch event or a touch event has occurred at the touch surface 104 based on at least one measurement signal received from the array of transceiver transducers 200. In some implementations, the receiver circuit may perform a signal amplitude threshold analysis by comparing the amplitude(s) of received measurement signal(s) with a threshold and determining whether a touch event or a no-touch event has occurred based on a result of the comparison.

The sensor circuit 107 further includes a controller (e.g., a microcontroller) configured to modulate an activation of the transceiver transducers 205 and/or to configure the operating modes of the transceiver transducers 205.

As indicated above, FIG. 2 is provided merely as an example. Other examples may differ from what is described with regard to FIG. 2. In some implementations, additional circuit components may be added without deviating from the disclosure provided above.

FIGS. 3A and 3B illustrate operation principles of the ultrasonic touch sensor 100 according to one or more implementations. For example, FIG. 3A illustrates an operation of the ultrasonic touch sensor 100 in an absence of a liquid droplet 300 during a touch event (e.g., during a touch made at the touch surface 104) and FIG. 3B illustrates an operation of the ultrasonic touch sensor 100 in a presence of the liquid droplet 300 on the touch surface during a no-touch event.

When the touch surface 104 is dry, as shown in FIG. 3A, the touch at the touch surface may result in an equal or substantially equal distribution of reflected ultrasound waves over multiple measurements. That is, if a sequence of ultrasonic transmit waves 112 are transmitted by the transmitter 105 during the touch, substantially similar ultrasonic reflected waves 114 may be produced by reflection at the second interface 111. As a result, the receiver 106 may measure substantially similar ultrasonic reflected waves 114 during the observation window that corresponds to the second interface 111. Thus, a degree of variation of the ultrasonic reflected waves 114 may be relatively low. The ultrasonic touch sensor 100 may detect the touch based on a reduction in amplitude in the ultrasonic reflected waves 114 in comparison to an amplitude of an ultrasonic reflected wave 114 that is produced during a no-touch event.

When the touch surface 104 is wet, as shown in FIG. 3B, due to the presence of the liquid droplet 300, an additional liquid-air interface 301 is formed that causes additional wave reflections of a portion of the ultrasonic transmit wave 112 that passes through the touch structure 102. A shape (e.g., curvature) of the liquid-air interface 301 may produce one or more additional ultrasonic reflected waves 302, 303, 304, and 305. A spatial distribution of the additional ultrasonic reflected waves 302, 303, 304, and 305 may be substantially inhomogeneous and a degree of variation in the additional ultrasonic reflected waves 302, 303, 304, and 305 (e.g., in the spatial distribution) may be higher than the degree of variation of the ultrasonic reflected waves 114. In other words, the additional ultrasonic reflected waves 302, 303, 304, and 305 may be unequal in reflection angle and/or amplitude (e.g., unequal in reflected energy). Moreover, the shape and/or position of the liquid droplet 300 may shift during a transmission sequence of multiple ultrasonic transmit waves 112. As a result, a manner in which the portion of the ultrasonic transmit wave 112 is reflected by the liquid-air interface 301 may change. This change in reflection may change the spatial distribution of the additional ultrasonic reflected waves 302, 303, 304, and 305 over the period of the sequence of ultrasonic transmit waves 112, causing the degree of variation between sequential measurements to increase.

The ultrasonic touch sensor 100, and, particularly, the sensor circuit 107, may use one or more different measurement configurations to measure a degree of variation of ultrasonic reflected waves received during a variance observation window that corresponds to a time interval during which reflections are expected to be received at the receiver 106 if liquid, such as water, is present on the touch surface 104. The variance observation window may be subsequent in time to the observation window used for measuring and evaluating the ultrasonic reflected wave 114 due to the additional ultrasonic reflected waves 302, 303, 304, and 305 having a longer time-of-flight, due to having been produced by a more distant reflection interface (e.g., the liquid-air interface 301) as compared to the ultrasonic reflected wave 114 being produced by the second interface 111.

Secondary reflections may also be produced by the second interface 111 due to multiple internal reflections within the touch structure 102, and these secondary reflections may be received by the receiver 106 during the variance observation window. However, having been produced by the second interface, the secondary reflections may have a relatively low degree of variation when compared to the degree of variation of the additional ultrasonic reflected waves 302, 303, 304, and 305, if present. Thus, the ultrasonic sensor circuit 107 may be capable of distinguishing between the secondary reflections produced by the second interface 111 when the touch surface 104 is dry and the additional ultrasonic reflected waves 302, 303, 304, and 305 produced by the liquid-air interface 301 based on the degree of variation measured during the variance observation window.

The sensor circuit 107 may be configured to discriminate between a touch event and a no-touch event to make an initial touch/no-touch decision by measuring and evaluating the ultrasonic reflected wave 114 during a corresponding observation window. The sensor circuit 107 may be further configured to measure the degree of variation in any ultrasonic reflected waves received during the variance observation window. The sensor circuit 107 may be configured to measure the degree of variation in a single excitation frame (e.g., using a single ultrasonic transmit wave 112) or over multiple excitation frames (e.g., using a sequence of ultrasonic transmit waves 112). Each excitation frame may have a corresponding variance observation window used for measuring ultrasonic reflected waves received in a desired time period corresponding to reflections expected from the liquid-air interface 301, if present.

The sensor circuit 107 may be configured to reject an initial touch detection as a false touch detection if the degree of variation satisfies a threshold (e.g., if the degree of variation exceeds a threshold), indicating a nonuniform spatial distribution of reflected ultrasound waves. In a case in which a false touch detection is determined, the sensor circuit 107 may generate a no-touch decision as a final measurement result. In contrast, the sensor circuit 107 may be configured to confirm the initial touch detection as a true touch detection if the degree of variation does not satisfy the threshold (e.g., if the degree of variation is equal to or less than the threshold), indicating a substantially uniform spatial distribution of reflected ultrasound waves. Thus, the sensor circuit 107 may be capable of making more reliable touch/ no-touch decisions and avoiding false touch detections, even when one or more liquid droplets are present on the touch surface.

As indicated above, FIGS. 3A and 3B are provided merely as examples. Other examples may differ from what is described with regard to FIGS. 3A and 3B. In some implementations, additional circuit components may be added without deviating from the disclosure provided above.

Figure 4:
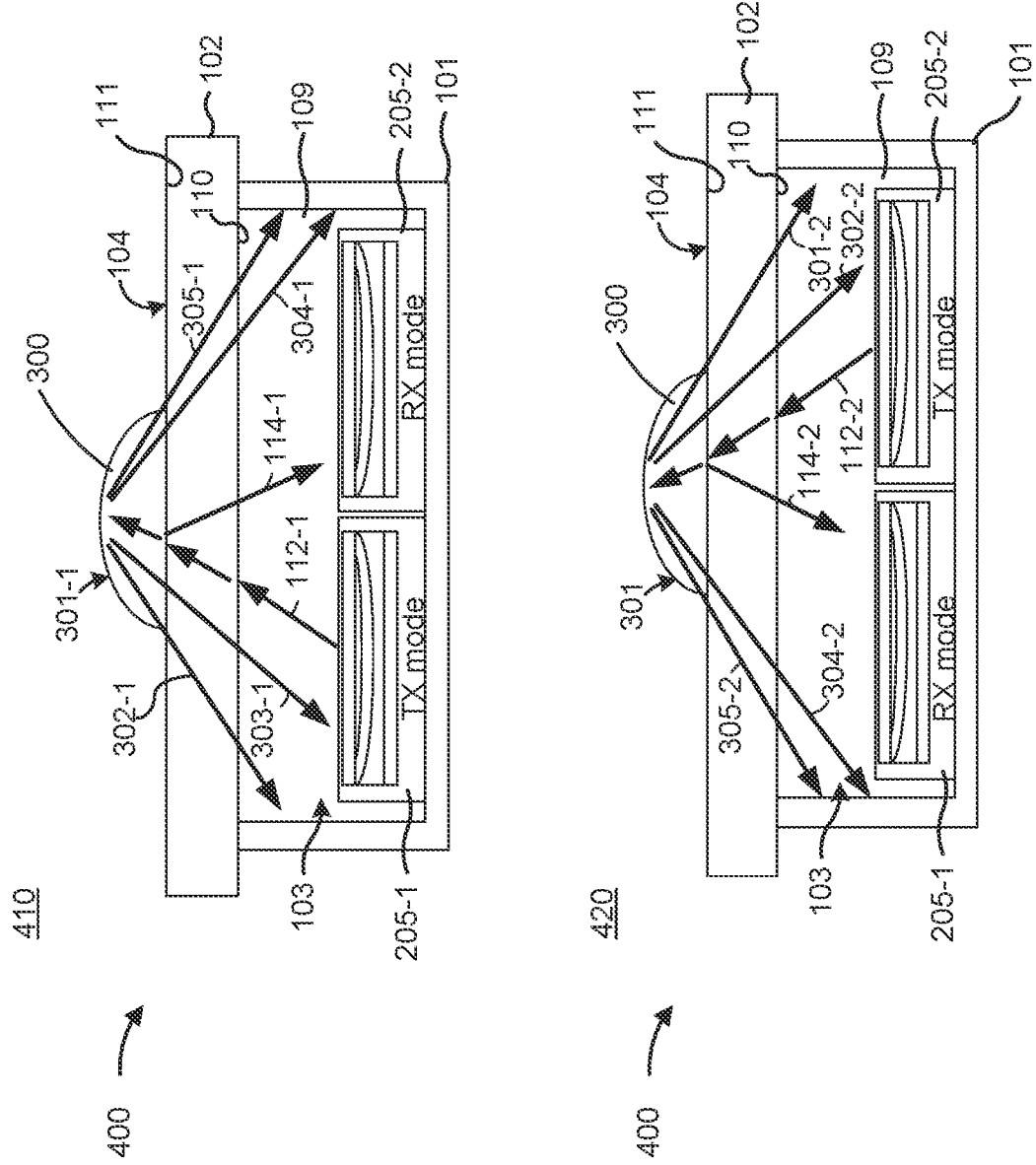
FIG. 4 illustrates an operation of an ultrasonic touch sensor according to one or more implementations.

FIG. 4 illustrates an operation of an ultrasonic touch sensor 400 according to one or more implementations. FIG. 4 includes a first diagram 410 that illustrates the ultrasonic touch sensor 400 being configured in a first TX/RX configuration and a second diagram 420 that illustrates the ultrasonic touch sensor 400 being configured in a second TX/RX configuration that is different from the first TX/RX configuration. For example, the first TX/RX configuration may be used during a first excitation frame (e.g., a first measurement frame) to perform a first measurement, and the second TX/RX configuration may be used during a second excitation frame (e.g., a second measurement frame) to perform a second measurement. The first measurement and the second measurement may be consecutive measurements performed sequentially in time.

The ultrasonic touch sensor 400 is similar to the ultrasonic touch sensor 100 described in connection with FIGS. 1, 3A, and 3B, with the exception that two transceiver transducers 205 are used, including a first transceiver transducer 205-1 and a second transceiver transducer 205-2. The first transceiver transducer 205-1 and the second transceiver transducer 205-2 may be neighboring or adjacent transceiver transducers such that the first transceiver transducer 205-1 and the second transceiver transducer 205-2 are capable of receiving wave reflections produced from a wave transmission generated by the other transceiver transducer.

The sensor circuit 107 may be arranged out of view (e.g., behind the two transceiver transducers 205). However, the ultrasonic touch sensor 400 may include the sensor circuit 107 that includes transmitter, receiver, and controller circuitry. For example, in some implementations, the sensor circuit 107 may include a signal generator that is configured to generate a first excitation signal during a first excitation frame (e.g., the first measurement frame) for producing a first ultrasonic transmit wave 112-1, and generate a second excitation signal during a second excitation frame (e.g., the second measurement frame) for producing a second ultrasonic transmit wave 112-2. Thus, the second excitation frame may be subsequent to the first excitation frame.

The first transceiver transducer 205-1 and the second transceiver transducer 205-2 may be configurable into a respective RX mode or a respective TX mode according to the first TX/RX configuration and the second TX/RX configuration. Thus, when configured in the first TX/RX configuration, the first transceiver transducer 205-1 may operate as a first transmitter and the second transceiver transducer 205-2 may operate as a first receiver and, when configured in the second TX/RX configuration, the first transceiver transducer 205-1 may operate as a second receiver and the second transceiver transducer 205-2 may operate as a second transmitter. In some implementations, three or more transceiver transducers 205 may be provided, and the three or more transceiver transducers 205 may be configured into different TX/RX configurations during different excitation frames. In some implementations, two or more transmitters and two or more receivers may be provided instead of two or more transceiver transducers 205.

As illustrated in the first diagram 410, the first transceiver transducer 205-1 is configured to receive the first excitation signal from the signal generator and transmit the first ultrasonic transmit wave 112-1 toward the touch structure 102 based on the first excitation signal. An ultrasonic reflected wave 114-1 corresponding to the first ultrasonic transmit wave 112-1 is produced by reflection at the second interface 111. The ultrasonic reflected wave 114-1 may be used by the second transceiver transducer 205-2 and the sensor circuit 107 for making an initial touch/no-touch decision. In addition, if the liquid droplet 300 is present on the touch surface 104, one or more additional ultrasonic reflected waves 302-1, 303-1, 304-1, and 305-1 may be produced by reflection at the liquid-air interface 301. The second transceiver transducer 205-2 may be configured to receive a first ultrasonic reflected wave produced by a reflection of the first ultrasonic transmit wave 112-1 and generate a first measurement signal representative of the first ultrasonic reflected wave.

The sensor circuit 107 may be configured to measure the first measurement signal during a first variance observation window that is part of the first excitation frame in order to generate a first measurement for evaluation. The first variance observation window may correspond to a first time interval during which the first ultrasonic reflected wave is expected to be received by the second transceiver transducer 205-2 if the liquid droplet 300 is present on the touch surface 104. Thus, the first measurement signal may correspond to one or more secondary reflections produced by the second interface 111 and/or one or more additional ultrasonic reflected waves 302-1, 303-1, 304-1, and 305-1, if the liquid droplet 300 is present on the touch surface 104. In other words, the first ultrasonic reflected wave may be one or more secondary reflections produced by the second interface 111, one or more of the additional ultrasonic reflected waves 302-1, 303-1, 304-1, and 305-1, or any combination thereof.

As illustrated in the second diagram 420, the second transceiver transducer 205-2 is configured to receive the second excitation signal from the signal generator and transmit the second ultrasonic transmit wave 112-2 toward the touch structure 102 based on the second excitation signal. An ultrasonic reflected wave 114-2 corresponding to the second ultrasonic transmit wave 112-2 is produced by reflection at the second interface 111. The ultrasonic reflected wave 114-2 may be used by the first transceiver transducer 205-1 and the sensor circuit 107 for making the initial touch/no-touch decision. In addition, if the liquid droplet 300 is present on the touch surface 104, one or more additional ultrasonic reflected waves 302-2, 303-2, 304-2, and 305-2 may be produced by reflection at the liquid-air interface 301. The first transceiver transducer 205-1 may be configured to receive a second ultrasonic reflected wave produced by a reflection of the second ultrasonic transmit wave 112-2 and generate a second measurement signal representative of the second ultrasonic reflected wave.

The sensor circuit 107 may be configured to measure the second measurement signal during a variance observation window that is part of the second excitation frame in order to generate a second measurement for evaluation. The second variance observation window may correspond to a second time interval during which the second ultrasonic reflected wave is expected to be received by the first transceiver transducer 205-1 if the liquid droplet 300 is present on the touch surface 104. Thus, the second measurement signal may correspond to one or more secondary reflections produced by the second interface 111 and/or one or more additional ultrasonic reflected waves 302-2, 303-2, 304-2, and 305-2, if the liquid droplet 300 is present on the touch surface 104. In other words, the second ultrasonic reflected wave may be one or more secondary reflections produced by the second interface 111, one or more of the additional ultrasonic reflected waves 302-2, 303-2, 304-2, and 305-2, or any combination thereof.

The sensor circuit 107 may include a measurement circuit that may be configured to measure a difference between the first measurement signal (e.g., the first measurement) and the second measurement signal (e.g., the second measurement). If the liquid droplet 300 is present on the touch surface 104, a degree of variation between the first measurement signal and the second measurement signal may be large compared to a degree of variation between the first measurement signal and the second measurement signal when the liquid droplet 300 is not present on the touch surface 104. Thus, the sensor circuit 107 may be configured to measure a difference between the first measurement signal and the second measurement signal, perform a comparison based on the difference and a first detection threshold, and determine whether a no-touch event or a touch event has occurred at the touch surface 104 based on whether the difference satisfies the first detection threshold.

For example, due to the first ultrasonic transmit wave 112-1 and the second ultrasonic transmit wave 112-2 having different trajectories, the additional ultrasonic reflected waves 302-1, 303-1, 304-1, and 305-1 produced from the first ultrasonic transmit wave 112-1 are likely to be dissimilar to the additional ultrasonic reflected waves 302-2, 303-2, 304-2, and 305-2 produced from the second ultrasonic transmit wave 112-1. In other words, the spatial distribution of the additional ultrasonic reflected waves 302-1, 303-1, 304-1, and 305-1 and the spatial distribution of the additional ultrasonic reflected waves 302-2, 303-2, 304-2, and 305-2 are likely to be nonuniform. In contrast, if the liquid droplet 300 is not present, only secondary reflections (e.g., produced from the second interface 111) would be received during the first and the second variance observation windows. As noted above, the spatial distribution of the secondary reflections would be substantially uniform, regardless of the different trajectories of the first ultrasonic transmit wave 112-1 and the second ultrasonic transmit wave 112-2.

Therefore, the difference between the first measurement signal and the second measurement signal may represent the degree of variation representative of the presence or absence of the liquid droplet 300. The difference between the first measurement signal and the second measurement signal may be a difference between the first measurement and the second measurement.

In some implementations, the first measurement may be a first Euclidean distance between the first measurement signal and a reference signal, and the second measurement may be a second Euclidean distance between the second measurement signal and the reference signal. For example, the sensor circuit 107 may be configured to acquire a first plurality of digital samples of the first measurement signal, calculate a first distance value of the first plurality of digital samples relative to the reference signal, acquire a second plurality of digital samples of the second measurement signal, calculate a second distance value of the second plurality of digital samples relative to the reference signal, and calculate a difference between the first distance value and the second distance value as the difference between the first measurement signal and the second measurement signal.

In some implementations, the first measurement may be an amplitude, an average amplitude, or a cumulative amplitude of the first measurement signal measured within the first variance observation window, and the second measurement may be an amplitude, an average amplitude, or a cumulative amplitude of the second measurement signal measured within the second variance observation window. For example, the sensor circuit 107 may be configured to measure a function of an amplitude of the first measurement signal to generate a first measured value, measure a function of an amplitude of the second measurement signal to generate a second measured value, and calculate a difference between the first measured value and the second measured value as the difference between the first measurement signal and the second measurement signal.

If the difference satisfies the first detection threshold (e.g., if the difference is greater than the first detection threshold), the sensor circuit 107 may determine that an initial touch detection is a false touch detection (e.g., due to the presence of the liquid droplet 300) and generate a no-touch decision. On the other hand, if the difference does not satisfy the first detection threshold (e.g., if the difference is not greater than the first detection threshold), the sensor circuit 107 may determine that an initial touch detection is a true touch detection (e.g., due to the presence of the liquid droplet 300) and generate a touch decision. Thus, the sensor circuit 107 may be configured to detect a touch event based on the difference being less than the first detection threshold, and the sensor circuit 107 may be configured to detect a no-touch event based on the difference being equal to or greater than the first detection threshold.

For example, the sensor circuit 107 may be configured to measure the first measurement signal during a first observation window that corresponds to the first ultrasonic reflected wave 114-1 produced by a reflection of the first ultrasonic transmit wave 112-1 at the second interface 111 to generate a touch measurement, compare the touch measurement with a second detection threshold, detect the touch event based on whether the touch measurement satisfies the second detection threshold (e.g., if an amplitude of the first measurement signal during the first observation window has been reduced by damping), measure the first measurement signal during a second observation window (e.g., the first variance observation window) that is subsequent in time to the first observation window to generate the first measurement, measure the second measurement signal during a third observation window (e.g., the second variance observation window) that is subsequent in time to the second observation window to generate the second measurement, calculate a difference between the first measurement and the second measurement as the difference between the first measurement signal and the second measurement signal, and determine whether the touch event is a true (e.g., actual) touch event or a false touch event based on whether the difference between the first measurement and the second measurement satisfies the first detection threshold.

The first observation window may correspond to a first time interval of the first excitation frame during which the ultrasonic reflected wave 114-1 is expected to be received by the second transceiver transducer 205-2 from the reflection of the ultrasonic transmit wave 112-1 at the second interface 111. The second observation window may correspond to a second time interval of the first excitation frame during which an ultrasonic reflected wave is expected to be received by the second transceiver transducer 205-2 if the liquid droplet 300 is present on the touch surface 104. The third observation window may correspond to a third time interval of the second excitation frame during which an ultrasonic reflected wave is expected to be received by the first transceiver transducer 205-1 if the liquid droplet 300 is present on the touch surface 104.

In some implementations, the sensor circuit 107 may be configured to determine that the touch event is the true touch event based on the difference between the first measurement and the second measurement being less than the first detection threshold, and determine that the touch event is the false touch event based on the difference between the first measurement and the second measurement being equal to or greater than the first detection threshold. By spatially shifting locations of the transmitters and the receivers of the ultrasonic touch sensor 400 (e.g., by swapping the TX and RX modes) to generate a different reflection angle, the sensor circuit 107 is able to detect a change in the spatial distribution of reflected waves due to the presence of the liquid-air interface 301.

As indicated above, FIG. 4 is provided merely as an example. Other examples may differ from what is described with regard to FIG. 4. In some implementations, additional circuit components may be added without deviating from the disclosure provided above.

Figure 5:
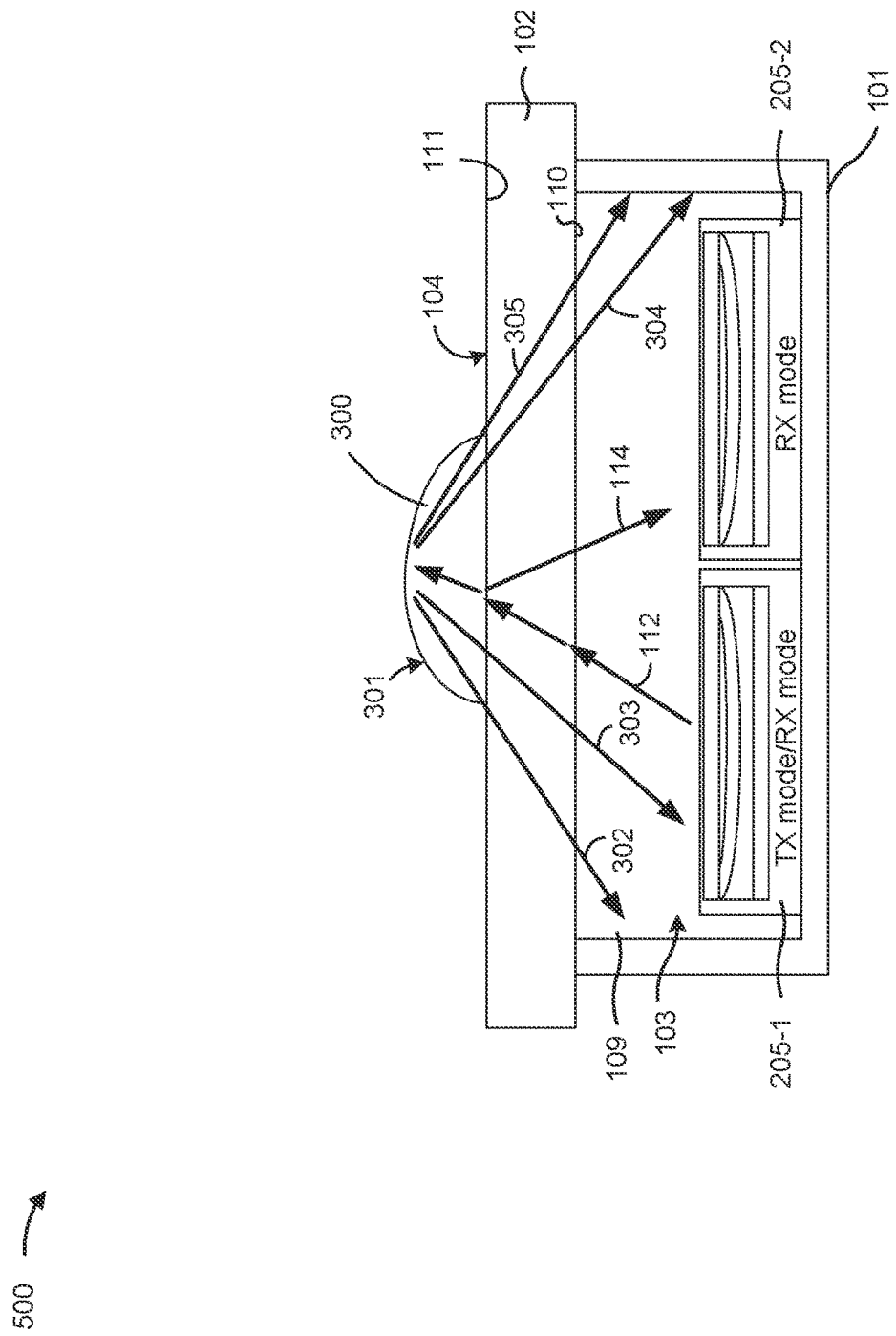
FIG. 5 illustrates an operation of an ultrasonic touch sensor according to one or more implementations.

FIG. 5 illustrates an operation of an ultrasonic touch sensor 500 according to one or more implementations. The ultrasonic touch sensor 500 is similar to the ultrasonic touch sensor 400 described in connection with FIG. 4, including the first transceiver transducer 205-1 and the second transceiver transducer 205-2. However, instead of TX and RX modes of the first transceiver transducer 205-1 and the second transceiver transducer 205-2 being swapped over two excitation frames, two measurements are obtained in a single excitation frame. For example, the first transceiver transducer 205-1 may be configured in the TX mode to operate as a transmitter in order to transmit the ultrasonic transmit wave 112 and switch into the RX mode, within the same excitation frame, after the ultrasonic transmit wave 112 has been transmitted in order to operate as a first receiver. The second transceiver transducer 205-2 may also be configured in the RX mode to operate as a second receiver within the same excitation frame.

Accordingly, the ultrasonic touch sensor 500 includes a plurality of spatially distributed receivers that are configured to simultaneously measure wave reflections produced from the same ultrasonic transmit wave 112 during a single excitation frame. Due to the spatial distribution of the receivers, the sensor circuit 107 is capable of generating multiple measurements (e.g., one for each receiver) and measure a degree of variation of the multiple measurements to detect a nonuniform spatial distribution of reflected waves due to the presence of the liquid-air interface 301.

The signal generator of the sensor circuit 107 may be configured to generate an excitation signal during an excitation frame (e.g., a measurement frame) for producing the ultrasonic transmit wave 112. The first transceiver transducer 205-1 may be configured to receive the excitation signal from the signal generator, transmit the ultrasonic transmit wave 112 toward the touch structure 102 based on the excitation signal, and then switch into the RX mode. An ultrasonic reflected wave 114 corresponding to the ultrasonic transmit wave 112 may be produced by reflection at the second interface 111. The ultrasonic reflected wave 114 may be used by the second transceiver transducer 205-2 and the sensor circuit 107 for making an initial touch/no-touch decision, as similarly described above. In addition, if the liquid droplet 300 is present on the touch surface 104, one or more additional ultrasonic reflected waves 302, 303, 304, and 305 may be produced by reflection at the liquid-air interface 301.

The first transceiver transducer 205-1, configured in the RX mode, may be configured to receive a first one of the ultrasonic reflected waves 302, 303, 304, and 305, and the second transceiver transducer 205-2 may be configured to receive a second one of the ultrasonic reflected waves 302, 303, 304, and 305. Thus, the plurality of ultrasonic receivers may be configured to receive a plurality of reflections of the ultrasonic transmit wave 112 and generate a plurality of measurement signals representative of the plurality of reflections. Each ultrasonic receiver of the plurality of ultrasonic receivers is configured to generate a respective measurement signal of the plurality of measurement signals. For example, the first transceiver transducer 205-1 may be configured to generate a first measurement signal and the second transceiver transducer 205-1 may be configured to generate a second measurement signal. A wave signature of the ultrasonic reflected wave received by the first transceiver transducer 205-1 and a wave signature of the ultrasonic reflected wave received by the second transceiver transducer 205-2 are likely to be dissimilar if the liquid droplet 300 is present on the touch surface 104. In contrast, the wave signatures may be substantially similar to each other if the liquid droplet 300 is not present on the touch surface 104.

The sensor circuit 107 may be configured to measure the first measurement signal and the second measurement signal during a same variance observation window that is part of the excitation frame in order to generate a first measurement and a second measurement, respectively, for evaluation. The variance observation window may correspond to a time interval during which the ultrasonic reflected waves are expected to be received by the first transceiver transducer 205-1 and the second transceiver transducer 205-2 if the liquid droplet 300 is present on the touch surface 104. Thus, the first measurement signal may correspond to one or more secondary reflections produced by the second interface 111 and/or one or more additional ultrasonic reflected waves 302, 303, 304, and 305, if the liquid droplet 300 is present on the touch surface 104. In other words, the ultrasonic reflected wave received by the first transceiver transducer 205-1 may be one or more secondary reflections produced by the second interface 111, one or more of the additional ultrasonic reflected waves 302, 303, 304, and 305, or any combination thereof.

Similarly, the second measurement signal may correspond to one or more secondary reflections produced by the second interface 111 and/or one or more additional ultrasonic reflected waves 302, 303, 304, and 305, if the liquid droplet 300 is present on the touch surface 104. In other words, the ultrasonic reflected wave received by the second transceiver transducer 205-2 may be one or more secondary reflections produced by the second interface 111, one or more of the additional ultrasonic reflected waves 302, 303, 304, and 305, or any combination thereof.

The sensor circuit 107 may be configured to measure a degree of variation of the plurality of measurement signals, compare the degree of variation with a first detection threshold, and determine whether a no-touch event or a touch event has occurred at the touch surface based on whether the degree of variation satisfies the first detection threshold. For example, the sensor circuit 107 may be configured to measure a difference between the first measurement signal (e.g., the first measurement) and the second measurement signal (e.g., the second measurement) as the degree of variation. If the liquid droplet 300 is present on the touch surface 104, a degree of variation between the first measurement signal and the second measurement signal may be large compared to a degree of variation between the first measurement signal and the second measurement signal when the liquid droplet 300 is not present on the touch surface 104. Thus, the sensor circuit 107 may be configured to measure a difference between the first measurement signal and the second measurement signal, perform a comparison based on the difference and the first detection threshold, and determine whether a no-touch event or a touch event has occurred at the touch surface 104 based on whether the difference satisfies the first detection threshold.

If the difference satisfies the first detection threshold (e.g., if the difference is greater than the first detection threshold), the sensor circuit 107 may determine that an initial touch detection is a false touch detection (e.g., due to the presence of the liquid droplet 300) and generate a no-touch decision. On the other hand, if the difference does not satisfy the first detection threshold (e.g., if the difference is not greater than the first detection threshold), the sensor circuit 107 may determine that an initial touch detection is a true touch detection (e.g., due to the presence of the liquid droplet 300) and generate a touch decision. Thus, the sensor circuit 107 may be configured to detect a touch event based on the difference being less than the first detection threshold, and the sensor circuit 107 may be configured to detect a no-touch event based on the difference being equal to or greater than the first detection threshold.

The sensor circuit 107 may apply an evaluation technique similar to one of the evaluation techniques described above in connection with FIG. 4, once the plurality of measurements have been generated, in order to determine whether the initial touch detection is a true touch detection or a false touch detection. For example, the plurality of measurements may be calculated as Euclidean distances and/or a function amplitude.

As indicated above, FIG. 5 is provided merely as an example. Other examples may differ from what is described with regard to FIG. 5. In some implementations, additional circuit components may be added without deviating from the disclosure provided above.

Figure 6:
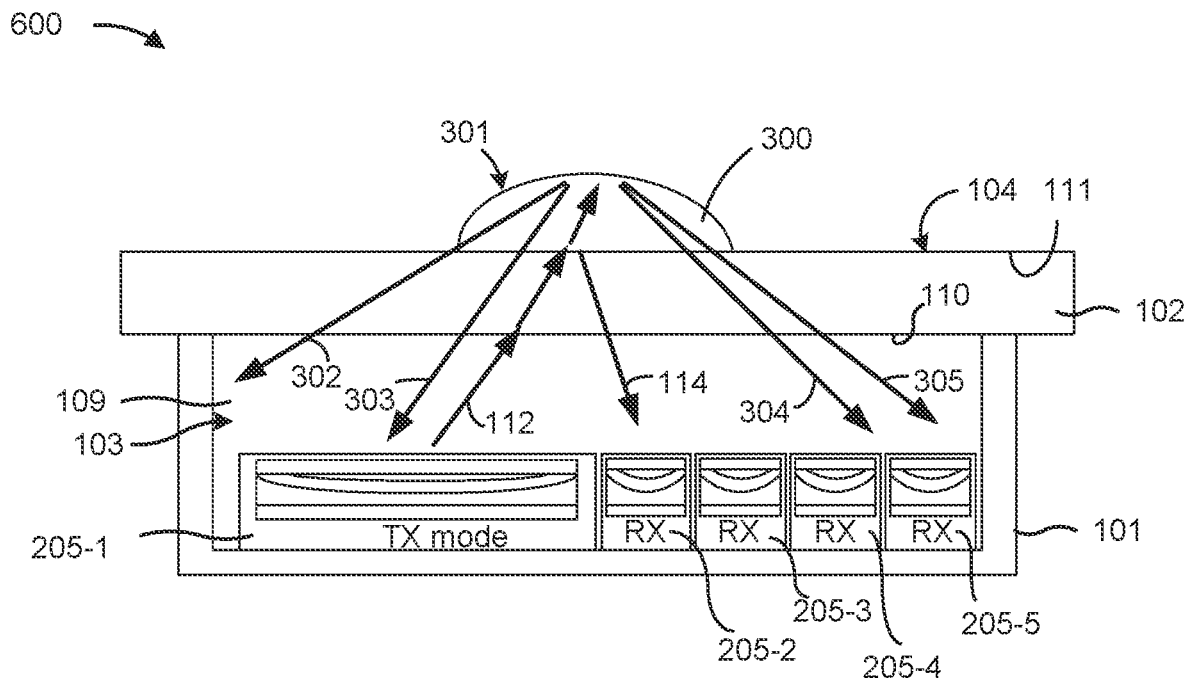
FIG. 6 illustrates an operation of an ultrasonic touch sensor according to one or more implementations.

FIG. 6 illustrates an operation of an ultrasonic touch sensor 600 according to one or more implementations. The ultrasonic touch sensor 600 is similar to the ultrasonic touch sensor 500 described in connection with FIG. 5, except that the ultrasonic touch sensor 600 includes additional transceiver transducers 205-3, 205-4, and 205-4. The first transceiver transducer 205-1 may be configured in the TX mode to operate as a transmitter, in order to transmit the ultrasonic transmit wave 112. In some implementations, the first transceiver transducer 205-1 may switch into the RX mode, within the same excitation frame, after the ultrasonic transmit wave 112 has been transmitted, in order to operate as a receiver. In addition, the second transceiver transducer 205-2 and the additional transceiver transducers 205-3, 205-4, and 205-4 may be configured in the RX mode as receivers, in order to receive reflections of the ultrasonic transmit wave 112.

Accordingly, the ultrasonic touch sensor 600 includes a plurality of spatially distributed receivers that are configured to simultaneously measure wave reflections produced from the same ultrasonic transmit wave 112 in a same excitation frame. In this example, the plurality of ultrasonic receivers are all offset from a lateral side of the first transceiver transducer 205-1 (e.g., the transmitter). Due to the spatial distribution of the receivers, the sensor circuit 107 is capable of generating multiple measurements (e.g., one for each receiver) and measure a degree of variation of the multiple measurements to detect a nonuniform spatial distribution of reflected waves due to the presence of the liquid-air interface 301.

The signal generator of the sensor circuit 107 may be configured to generate an excitation signal during an excitation frame (e.g., a measurement frame) for producing the ultrasonic transmit wave 112. The first transceiver transducer 205-1 may be configured to receive the excitation signal from the signal generator and transmit the ultrasonic transmit wave 112 toward the touch structure 102 based on the excitation signal. An ultrasonic reflected wave 114 corresponding to the ultrasonic transmit wave 112 may be produced by reflection at the second interface 111. The ultrasonic reflected wave 114 may be used by, for example, the second transceiver transducer 205-2 and the sensor circuit 107 for making an initial touch/no-touch decision, as similarly described above. In addition, if the liquid droplet 300 is present on the touch surface 104, one or more additional ultrasonic reflected waves 302, 303, 304, and 305 may be produced by reflection at the liquid-air interface 301.

In some implementation, the first transceiver transducer 205-1 may be reconfigured into the RX mode after transmitting the ultrasonic transmit wave 112 and used as a receiver to measure the ultrasonic reflected wave 114 and/or to measure one or more additional ultrasonic reflected waves 302, 303, 304, and 305.

Collectively, the plurality of ultrasonic receivers 205-2, 205-3, 205-4, and 205-5 may be configured to receive a plurality of reflections of the ultrasonic transmit wave 112 and generate a plurality of measurement signals representative of the plurality of reflections. Each ultrasonic receiver of the plurality of ultrasonic receivers 205-2, 205-3, 205-4, and 205-5 may be configured to generate a respective measurement signal of the plurality of measurement signals. For example, the second transceiver transducer 205-2 may be configured to receive a first reflection and generate a first measurement signal, the third transceiver transducer 205-3 may be configured to receive a second reflection and generate a second measurement signal, the fourth transceiver transducer 205-4 may be configured to receive a third reflection and generate a third measurement signal, and the fifth transceiver transducer 205-4 may be configured to receive a fourth reflection and generate a fourth measurement signal. Wave signatures of the ultrasonic reflected waves received by the plurality of ultrasonic receivers 205-2, 205-3, 205-4, and 205-5 are likely to be dissimilar if the liquid droplet 300 is present on the touch surface 104. In contrast, the wave signatures may be substantially similar to each other if the liquid droplet 300 is not present on the touch surface 104. In some implementation, the first transceiver transducer 205-1 may also be used as a receiver for generating a measurement signal used in the evaluation.

The sensor circuit 107 may be configured to measure the plurality of measurement signals during a same variance observation window that is part of the excitation frame in order to generate a plurality of measurements (e.g., a first measurement, a second measurement, a third measurement, and a fourth measurement) for evaluation. The variance observation window may correspond to a time interval during which the ultrasonic reflected waves are expected to be received by the plurality of ultrasonic receivers 205-2, 205-3, 205-4, and 205-5 if the liquid droplet 300 is present on the touch surface 104. Thus, each measurement signal may correspond to one or more secondary reflections produced by the second interface 111 and/or one or more additional ultrasonic reflected waves 302, 303, 304, and 305, if the liquid droplet 300 is present on the touch surface 104.

The sensor circuit 107 may be configured to measure a degree of variation of the plurality of measurement signals, compare the degree of variation with a first detection threshold, and determine whether a no-touch event or a touch event has occurred at the touch surface based on whether the degree of variation satisfies the first detection threshold. For example, the sensor circuit 107 may be configured to measure differences between the plurality of measurements (e.g., a first measurement, a second measurement, a third measurement, and a fourth measurement) as the degree of variation. In some implementations, the sensor circuit 107 may determine a maximum difference amongst the differences of the plurality of measurements as the degree of variation. In some implementations, the sensor circuit 107 may determine an average difference amongst the differences of the plurality of measurements as the degree of variation.

If the liquid droplet 300 is present on the touch surface 104, a degree of variation among the plurality of measurements may be large compared to a degree of variation among the plurality of measurements when the liquid droplet 300 is not present on the touch surface 104. Thus, the sensor circuit 107 may be configured to measure the degree of variation of the plurality of measurement signals, compare the degree of variation with a first detection threshold, and determine whether a no-touch event or a touch event has occurred at the touch surface 104 based on whether the degree of variation satisfies the first detection threshold.

If the degree of variation satisfies the first detection threshold (e.g., if the degree of variation is greater than the first detection threshold), the sensor circuit 107 may determine that an initial touch detection is a false touch detection (e.g., due to the presence of the liquid droplet 300) and generate a no-touch decision. On the other hand, if the degree of variation does not satisfy the first detection threshold (e.g., if the degree of variation is not greater than the first detection threshold), the sensor circuit 107 may determine that an initial touch detection is a true touch detection (e.g., due to the presence of the liquid droplet 300) and generate a touch decision. Thus, the sensor circuit 107 may be configured to detect a touch event based on the degree of variation being less than the first detection threshold, and the sensor circuit 107 may be configured to detect a no-touch event based on the degree of variation being equal to or greater than the first detection threshold.

The sensor circuit 107 may apply an evaluation technique similar to the evaluation techniques described above in connection with FIG. 4, once the plurality of measurements have been generated, in order to determine whether the initial touch detection is a true touch detection or a false touch detection. For example, the plurality of measurements may be calculated as Euclidean distances and/or a function amplitude.

As indicated above, FIG. 6 is provided merely as an example. Other examples may differ from what is described with regard to FIG. 6. In some implementations, additional circuit components may be added without deviating from the disclosure provided above.

Figure 7:
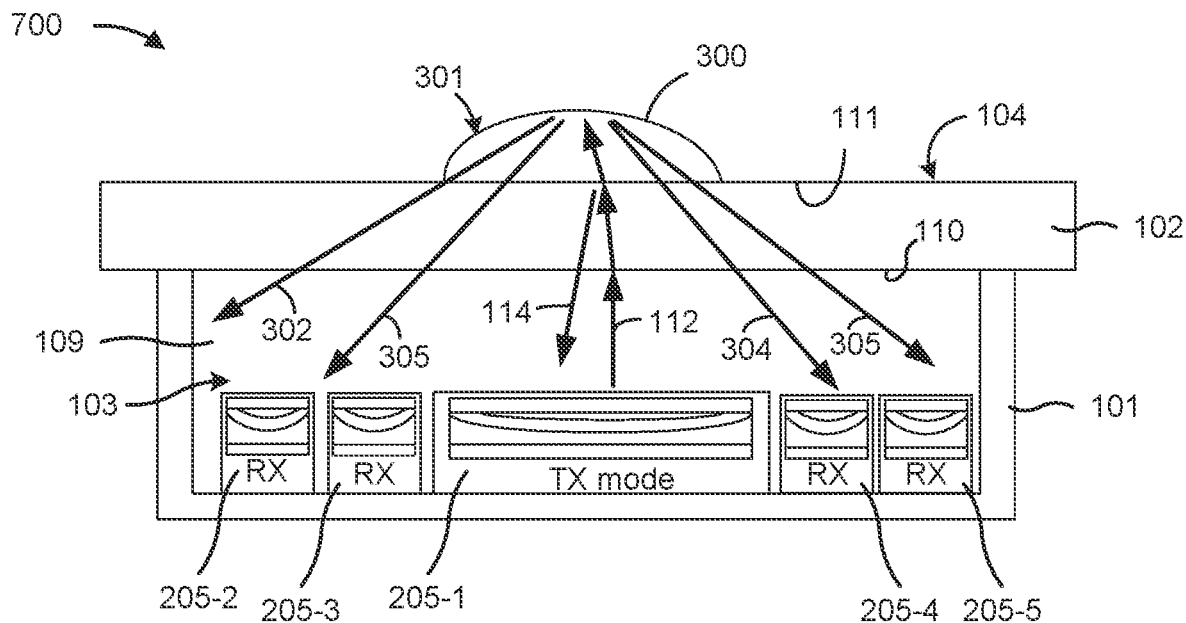
FIG. 7 illustrates an operation of an ultrasonic touch sensor according to one or more implementations.

FIG. 7 illustrates an operation of an ultrasonic touch sensor 700 according to one or more implementations. The ultrasonic touch sensor 700 is similar to the ultrasonic touch sensor 600 described in connection with FIG. 6, except that the second transceiver transducer 205-2 and the additional transceiver transducers 205-3, 205-4, and 205-4 are offset from two or more lateral sides of the first transceiver transducer 205-1. Due to the spatial distribution of the receivers, the sensor circuit 107 is capable of generating multiple measurements (e.g., one for each receiver) and measure a degree of variation of the multiple measurements to detect a nonuniform spatial distribution of reflected waves due to the presence of the liquid-air interface 301. In some implementation, the first transceiver transducer 205-1 may be reconfigured into the RX mode after transmitting the ultrasonic transmit wave 112 and used as a receiver to measure the ultrasonic reflected wave 114 and/or to measure one or more additional ultrasonic reflected waves 302, 303, 304, and 305.

The sensor circuit 107 may apply an evaluation technique similar to the evaluation techniques described above in connection with FIG. 6, once the plurality of measurements have been generated, in order to determine whether the initial touch detection is a true touch detection or a false touch detection. For example, the plurality of measurements may be calculated as Euclidean distances and/or a function amplitude.

As indicated above, FIG. 7 is provided merely as an example. Other examples may differ from what is described with regard to FIG. 7. In some implementations, additional circuit components may be added without deviating from the disclosure provided above.

Figure 8:
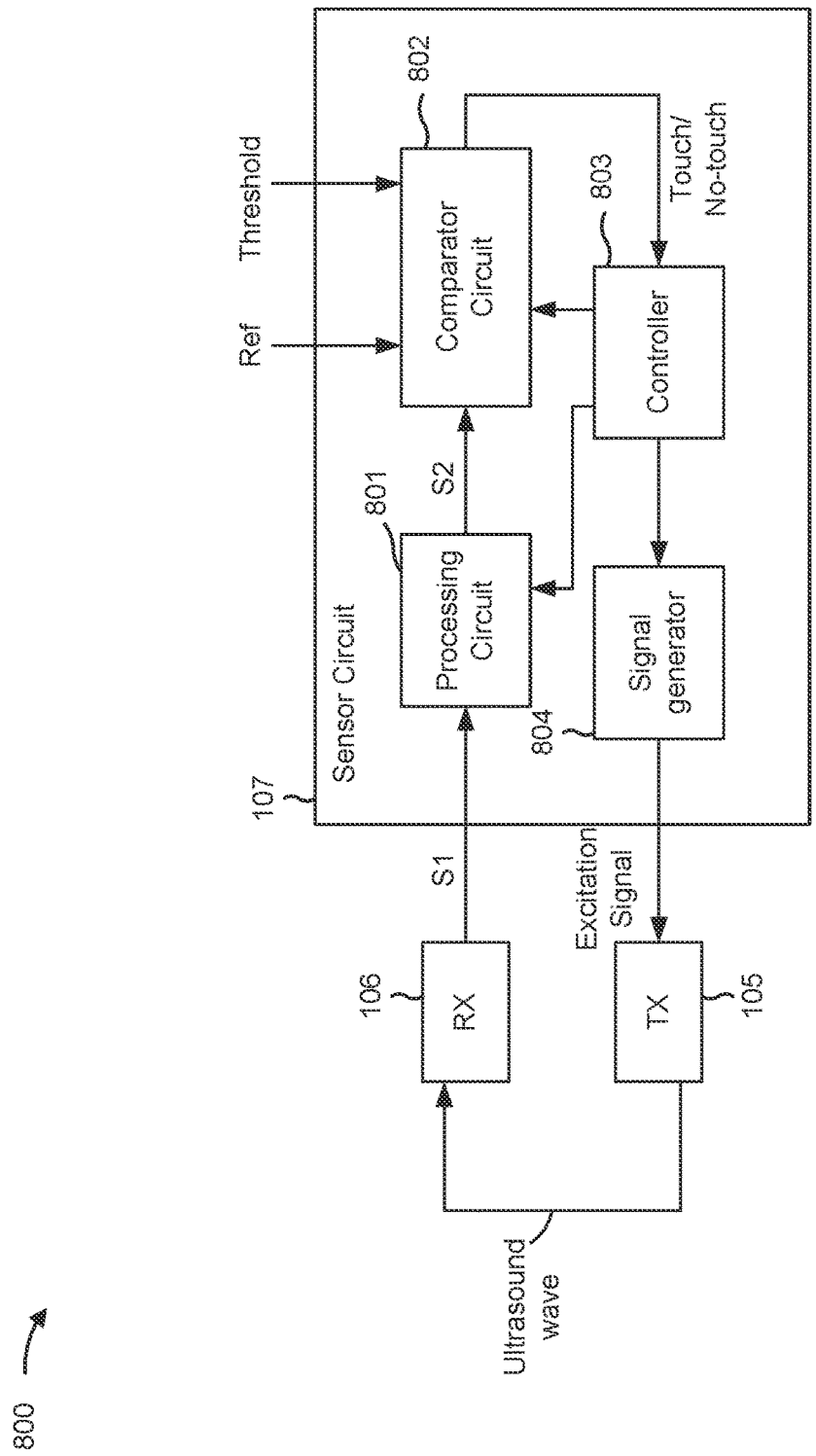
FIG. 8 illustrates a schematic block diagram of an ultrasonic touch sensor according to one or more implementations.

FIG. 8 illustrates a schematic block diagram of an ultrasonic touch sensor 800 according to one or more implementations. The ultrasonic touch sensor 800 is similar to the ultrasonic touch sensors 100, 400, 500, 600, and 700 described above. The ultrasonic touch sensor 800 includes the transmitter 105 and the receiver 106. The transmitter 105 and the receiver 106 are acoustically coupled such that the receiver 106 receives reflected ultrasound waves (e.g., ultrasonic reflected waves 113 and 114) from an ultrasound wave (e.g., ultrasonic transmit wave 112) transmitted by the transmitter 105. In some implementations, the transmitter 105 and the receiver 106 may be transceiver transducers 205 configurable into TX and RX modes. Additionally, in some implementations, three or more transceiver transducers 205 may be provided.

The ultrasonic touch sensor 800 also includes a sensor circuit 107 that is electrically coupled to the transmitter 105 and the receiver 106. While only a single receiver and a single measurement channel (e.g., signal path) are illustrated, the sensor circuit 107 may include multiple measurement channels, with each measurement channel corresponding to a different receiver. In some implementations, the sensor circuit 107 includes a processing circuit 801, a comparator circuit 802, a controller 803, and a signal generator 804. The processing circuit 801 and the comparator circuit 802 may form a measurement circuit used for measuring signals and determining whether a no-touch event or a touch event has occurred at the touch surface 104.

In some implementations, the controller 803 may control (e.g., trigger) the signal generator 804 to generate an excitation signal and transmit the excitation signal to the transmitter 105. The transmitter 105 is configured to receive the excitation signal and transmit the ultrasonic transmit wave 112 toward the touch structure 102 based on the excitation signal.

The receiver 106 may be configured to generate a measurement signal S1 representative of an ultrasonic reflected wave, which may be evaluated during a corresponding observation window.

The processing circuit 801 is configured to process the measurement signal S1 in order to determine a feature of the measurement signal S1 and generate a measured value S2 based on the feature of the measurement signal S1. In some implementations, the processing circuit 801 may include a processor, included in the sensor circuit 107, that is configured to evaluate the feature of the measurement signal S1 in order to generate the measured value S2 that is representative of the feature of the measurement signal S1. The processor may include an analog processing circuit that operates in an analog domain, a digital processing circuit that operates in a digital domain, or both the analog processing circuit and the digital processing circuit, for evaluating the feature of the measurement signal S1 and for generating the measured value S2. Thus, the measured value S2 may be an analog value or a digital value.

The processor may be operable in combination with other processing components of the processing circuit 801 described herein to generate the measured value. For example, the processing circuit 801 may include an ADC that converts the measurement signal S1 into the digital domain for processing by a digital processor, such as a digital signal processor (DSP). The ADC may generate multiple digital samples (e.g., measurement samples) from the measurement signal S1 during the corresponding observation window and provide the multiple digital samples to the digital processor for processing. The processor may receive the multiple digital samples and generate the measured value S2 from one or more of the multiple digital samples.

In some implementations, the processing circuit 801 (e.g., the processor) may be configured to measure a function of an amplitude of the measurement signal S1 during the corresponding observation window to generate the measured value S2. For example, the measured value S2 may be a global extremum of the measurement signal S1 measured within a predetermined measurement interval (e.g., the corresponding observation window), a maximum peak-to-peak amplitude of the measurement signal S1 measured within the predetermined measurement interval, an average amplitude of the measurement signal S1 measured within the predetermined measurement interval, or a median amplitude of the measurement signal S1 measured within the predetermined measurement interval.

In some implementations, the processing circuit 801 (e.g., the processor) may be configured to calculate a distance of the measurement signal S1 relative to the reference signal during the corresponding observation window to generate the measured value S2. For example, the processing circuit 801 may calculate a Euclidean distance between the measurement signal S1 and the reference signal as the measured value S2, a squared Euclidian distance between the measurement signal S1 and the reference signal as the measured value S2, a Chebyshev distance between the measurement signal S1 and the reference signal as the measured value S2, a Manhattan distance between the measurement signal S1 and the reference signal as the measured value S2, or a Minkowski distance between the measurement signal S1 and the reference signal as the measured value S2.

The comparator circuit 802 may be configured to perform a comparison of the measurement signal S1 with a threshold and determine whether a no-touch event or a touch event has occurred at the touch surface 104 based on whether the first measurement signal S1 satisfies the threshold. In some implementations, the comparator circuit 802 may compare the measured value S2 to the threshold, detect the no-touch event when the measured value S2 does not satisfy the threshold (e.g., the measured value S2 is equal to or greater than the threshold, the measured value S2 is greater than the threshold, or the measured value S2 does not satisfy another condition relative to the threshold), and detect the touch event when the measured value S2 satisfies the threshold (e.g., the measured value S2 is equal to or less than the threshold, the measured value S2 is less than the threshold, or the measured value S2 satisfies another condition relative to the threshold).

In some implementations, the comparator circuit 802 may detect the no-touch event when a difference between the measured value S2 and a reference value Ref does not satisfy the threshold (e.g., the difference is equal to or less than the threshold, the difference is less the threshold, or the difference satisfies another condition relative to the threshold), and detect the touch event when the difference between the measured value S2 and the reference value Ref satisfies the threshold (e.g., the difference is equal to or greater than the threshold, the difference is greater than the threshold, or the difference satisfies another condition relative to the threshold). For example, the comparator circuit 802 may calculate the difference between the measured value S2 and the reference value Ref for performing a comparison of the difference with the threshold for generating a comparison result.

If the sensor circuit 107 calculates the measured value S2 as the distance of the measurement signal S1 relative to the reference signal, the comparator circuit 802 may be configured to detect the no-touch event when the measured value S2 does not satisfy the threshold (e.g., the measured value is equal to or less than the threshold, the measured value is less the threshold, or the measured value satisfies another condition relative to the threshold), and may detect the touch event when the measured value satisfies the threshold (e.g., the measured value is equal to or greater than the threshold, the measured value is greater than the threshold, or the measured value satisfies another condition relative to the threshold).

The comparator circuit 802 may be configured to make a touch/no-touch decision based on the comparison result. The comparator circuit 802 may transmit a decision output signal that is indicative of the touch/no-touch decision to the controller 803 that may be configured to perform additional actions or functions based on a result of the touch/no-touch decision.

As indicated above, FIG. 8 is provided merely as an example. Other examples may differ from what is described with regard to FIG. 8. The number and arrangement of components shown in FIG. 8 are provided as an example. In practice, the ultrasonic touch sensor 800 may include additional components, fewer components, different components, or differently arranged components than those shown in FIG. 8. Two or more components shown in FIG. 8 may be implemented within a single component, or a single component shown in FIG. 8 may be implemented as multiple, distributed components. Additionally, or alternatively, a set of components (e.g., one or more components) of the ultrasonic touch sensor 800 may perform one or more functions described as being performed by another set of components of the ultrasonic touch sensor 800. In some implementations, the ultrasonic touch sensor 800 may be configured to target any ultrasonic reflected wave for measurement that undergoes a change in response to a touch event (e.g., a direct touch event or an indirect touch event) occurrent at the touch surface 104 or a change in response to a change in touch environment. Such a configuration would enable the ultrasonic touch sensor 800 to have flexibility to accommodate different types of touch structures, different types of touch gestures, and/or different types of touch environments.

The following provides an overview of some Aspects of the present disclosure:

Aspect 1: An ultrasonic touch sensor, comprising: a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate a first excitation signal for producing a first ultrasonic transmit wave and a second excitation signal for producing a second ultrasonic transmit wave; a first ultrasonic transmitter arranged within the ultrasound chamber, wherein the first ultrasonic transmitter is configured to receive the first excitation signal and transmit the first ultrasonic transmit wave toward the touch structure based on the first excitation signal; a second ultrasonic transmitter arranged within the ultrasound chamber, wherein the second ultrasonic transmitter is configured to receive the second excitation signal and transmit the second ultrasonic transmit wave toward the touch structure based on the second excitation signal; a first ultrasonic receiver arranged within the ultrasound chamber, wherein the first ultrasonic receiver is configured to receive a first ultrasonic reflected wave produced by a reflection of the first ultrasonic transmit wave and generate a first measurement signal representative of the first ultrasonic reflected wave; a second ultrasonic receiver arranged within the ultrasound chamber, wherein the second ultrasonic receiver is configured to receive a second ultrasonic reflected wave produced by a reflection of the second ultrasonic transmit wave and generate a second measurement signal representative of the second ultrasonic reflected wave; and a measurement circuit coupled to the first ultrasonic receiver and the second ultrasonic receiver, wherein the measurement circuit is configured to measure a difference between the first measurement signal and the second measurement signal, perform a comparison based on the difference and a first detection threshold, and determine whether a no-touch event or a touch event has occurred at the touch surface based on whether the difference satisfies the first detection threshold.

Aspect 2: The ultrasonic touch sensor of Aspect 1, wherein the measurement circuit is configured to detect the touch event based on the difference being less than the first detection threshold, and wherein the measurement circuit is configured to detect the no-touch event based on the difference being equal to or greater than the first detection threshold.

Aspect 3: The ultrasonic touch sensor of any of Aspects 1-2, wherein the measurement circuit is configured to measure the first measurement signal during a first observation window to generate a first measurement, wherein the first observation window corresponds to a first time interval during which the first ultrasonic reflected wave is expected to be received by the first ultrasonic receiver if water is present on the touch surface, wherein the measurement circuit is configured to measure the second measurement signal during a second observation window to generate a second measurement, wherein the second observation window corresponds to a second time interval during which the second ultrasonic reflected wave is expected to be received by the second ultrasonic receiver if the water is present on the touch surface, and wherein the difference is a difference between the first measurement and the second measurement.

Aspect 4: The ultrasonic touch sensor of Aspect 3, the signal generator is configured to generate the first excitation signal in a first measurement frame and generate the second excitation signal in a second measurement frame that is subsequent to the first measurement frame, and wherein the first observation window is part of the first measurement frame and the second observation window is part of the second measurement frame.

Aspect 5: The ultrasonic touch sensor of any of Aspects 1-4, wherein the measurement circuit is configured to: acquire a first plurality of digital samples of the first measurement signal, calculate a first distance value of the first plurality of digital samples relative to a reference signal, acquire a second plurality of digital samples of the second measurement signal, calculate a second distance value of the second plurality of digital samples relative to the reference signal, and calculate a difference between the first distance value and the second distance value as the difference between the first measurement signal and the second measurement signal.

Aspect 6: The ultrasonic touch sensor of any of Aspects 1-5, wherein the measurement circuit is configured to: measure a function of an amplitude of the first measurement signal to generate a first measured value, measure a function of an amplitude of the second measurement signal to generate a second measured value, and calculate a difference between the first measured value and the second measured value as the difference between the first measurement signal and the second measurement signal.

Aspect 7: The ultrasonic touch sensor of any of Aspects 1-6, wherein the signal generator is configured to generate the first excitation signal in a first measurement frame and generate the second excitation signal in a second measurement frame subsequent to the first measurement frame.

Aspect 8: The ultrasonic touch sensor of Aspect 7, wherein the ultrasonic touch sensor further comprises: a first ultrasonic transceiver, wherein the first ultrasonic transceiver is configured as the first ultrasonic transmitter during the first measurement frame and the first ultrasonic transceiver is configured as the second ultrasonic receiver during the second measurement frame; and a second ultrasonic transceiver, wherein the second ultrasonic transceiver is configured as the first ultrasonic receiver during the first measurement frame and the second ultrasonic transceiver is configured as the second ultrasonic transmitter during the second measurement frame.

Aspect 9: The ultrasonic touch sensor of any of Aspects 1-8, wherein a measurement circuit is configured to: measure the first measurement signal during a first observation window that corresponds to the first ultrasonic reflected wave produced by a reflection of the ultrasonic transmit wave at the touch interface to generate a first measurement, compare the first measurement with a second detection threshold, detect the touch event based on whether the first measurement satisfies the second detection threshold, measure the first measurement signal during a second observation window that is subsequent in time to the first observation window to generate a second measurement, measure the second measurement signal during a third observation window that is subsequent in time to the second observation window to generate a third measurement, calculate a difference between the second measurement and the third measurement as the difference between the first measurement signal and the second measurement signal, and determine whether the touch event is an actual touch event or a false touch event based on whether the difference between the second measurement and the third measurement satisfies the first detection threshold.

Aspect 10: The ultrasonic touch sensor of Aspect 9, wherein the measurement circuit is configured to determine that the touch event is the actual touch event based on the difference between the second measurement and the third measurement being less than the first detection threshold, and wherein the measurement circuit is configured to determine that the touch event is the false touch event based on the difference between the second measurement and the third measurement being equal to or greater than the first detection threshold.

Aspect 11: The ultrasonic touch sensor of Aspect 9, wherein the first observation window corresponds to a first time interval during which the first ultrasonic reflected wave is expected to be received by the first ultrasonic receiver from the reflection of the ultrasonic transmit wave at the touch interface, wherein the second observation window corresponds to a second time interval during which the first ultrasonic reflected wave is expected to be received by the first ultrasonic receiver if water is present on the touch surface, and wherein the third observation window corresponds to a third time interval during which the second ultrasonic reflected wave is expected to be received by the second ultrasonic receiver if the water is present on the touch surface.

Aspect 12: An ultrasonic touch sensor, comprising: a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; an ultrasonic transmitter arranged within the ultrasound chamber, wherein the ultrasonic transmitter is configured to receive the excitation signal and transmit the ultrasonic transmit wave toward the touch structure based on the excitation signal; a plurality of ultrasonic receivers arranged within the ultrasound chamber, wherein the plurality of ultrasonic receivers are configured to receive a plurality of reflections of the ultrasonic transmit wave and generate a plurality of measurement signals representative of the plurality of reflections, wherein each ultrasonic receiver of the plurality of ultrasonic receivers is configured to generate a respective measurement signal of the plurality of measurement signals; and a measurement circuit coupled to the plurality of ultrasonic receivers, wherein the measurement circuit is configured to measure a degree of variation of the plurality of measurement signals, compare the degree of variation with a first detection threshold, and determine whether a no-touch event or a touch event has occurred at the touch surface based on whether the degree of variation satisfies the first detection threshold.

Aspect 13: The ultrasonic touch sensor of Aspect 12, wherein the measurement circuit is configured to detect the touch event based on the degree of variation being less than the first detection threshold, and wherein the measurement circuit is configured to detect the no-touch event based on the degree of variation being equal to or greater than the first detection threshold.

Aspect 14: The ultrasonic touch sensor of any of Aspects 12-13, wherein the ultrasonic transmitter is an ultrasonic transceiver configurable into a transmission mode for transmitting the ultrasonic transmit wave and configurable into a receiving mode as one of the plurality of ultrasonic receivers to receive a respective reflection, and wherein the ultrasonic transceiver is configured into the receiving mode after transmitting the ultrasonic transmit wave.

Aspect 15: The ultrasonic touch sensor of any of Aspects 12-14, wherein the plurality of ultrasonic receivers includes a first ultrasonic receiver and a second ultrasonic receiver, wherein the first ultrasonic receiver is configured to receive a first reflection of the plurality of reflections and generate a first measurement signal representative of the first reflection, wherein the second ultrasonic receiver is configured to receive a second reflection of the plurality of reflections and generate a second measurement signal representative of the second reflection, and wherein the measurement circuit is configured to measure a difference between the first measurement signal and the second measurement signal, perform a comparison based on the difference and the first detection threshold, and determine whether the no-touch event or the touch event has occurred at the touch surface based on whether the difference satisfies the first detection threshold.

Aspect 16: The ultrasonic touch sensor of Aspect 15, wherein the measurement circuit is configured to: acquire a first plurality of digital samples of the first measurement signal, calculate a first distance value of the first plurality of digital samples relative to a reference signal, acquire a second plurality of digital samples of the second measurement signal, calculate a second distance value of the second plurality of digital samples relative to the reference signal, and calculate a difference between the first distance value and the second distance value as the difference between the first measurement signal and the second measurement signal.

Aspect 17: The ultrasonic touch sensor of Aspect 15, wherein the measurement circuit is configured to: measure a function of an amplitude of the first measurement signal to generate a first measured value, measure a function of an amplitude of the second measurement signal to generate a second measured value, and calculate a difference between the first measured value and the second measured value as the difference between the first measurement signal and the second measurement signal.

Aspect 18: The ultrasonic touch sensor of any of Aspects 12-17, wherein the measurement circuit is configured to measure the plurality of measurement signals during an observation window that corresponds to a time interval during which the plurality of reflections are expected to be received by the plurality of ultrasonic receivers if water is present on the touch surface.

Aspect 19: The ultrasonic touch sensor of any of Aspects 12-18, wherein the plurality of ultrasonic receivers are offset from a lateral side of the ultrasonic transmitter.

Aspect 20: The ultrasonic touch sensor of any of Aspects 12-19, wherein the plurality of ultrasonic receivers are offset from two or more lateral sides of the ultrasonic transmitter.

Aspect 21: The ultrasonic touch sensor of any of Aspects 12-20, wherein a measurement circuit is configured to: measure a first measurement signal of the plurality of measurement signals during a first observation window to generate a first measurement, wherein the first observation window corresponds to an initial reflection of the ultrasonic transmit wave produced at the touch interface, compare the first measurement with a second detection threshold, detect the touch event based on whether the first measurement satisfies the second detection threshold, measure the plurality of measurement signals during a second observation window that is subsequent in time to the first observation window to generate a plurality of second measurements, wherein each second measurement of the plurality of second measurements corresponds to a respective measurement signal of the plurality of measurement signals, measure the degree of variation of the plurality of second measurements as the degree of variation of the plurality of measurement signals, and determine whether the touch event is an actual touch event or a false touch event based on whether the degree of variation of the plurality of second measurements satisfies the first detection threshold.

Aspect 22: The ultrasonic touch sensor of Aspect 21, wherein the measurement circuit is configured to determine that the touch event is the actual touch event based on the degree of variation of the plurality of second measurements being less than the first detection threshold, and wherein the measurement circuit is configured to determine that the touch event is the false touch event based on the degree of variation of the plurality of second measurements being equal to or greater than the first detection threshold.

Aspect 23: The ultrasonic touch sensor of Aspect 21, wherein the first observation window corresponds to a first time interval during which the initial reflection is expected to be received by the plurality of ultrasonic receivers, and wherein the second observation window corresponds to a second time interval during which the plurality of reflections are expected to be received by the plurality of ultrasonic receivers if water is present on the touch surface.

Aspect 24: A method, comprising: transmitting, by an ultrasonic transmitter, an ultrasonic transmit wave toward a touch structure of an ultrasonic touch sensor; receiving, by a plurality of ultrasonic receivers, a plurality of reflections of the ultrasonic transmit wave; generating, by the plurality of ultrasonic receivers, a plurality of measurement signals representative of the plurality of reflections; measuring, by a measurement circuit, a degree of variation of the plurality of measurement signals; comparing, by the measurement circuit, the degree of variation with a detection threshold; and determining, by the measurement circuit, whether a no-touch event or a touch event has occurred at the touch surface based on whether the degree of variation satisfies the detection threshold.

Aspect 25: A system configured to perform one or more operations recited in one or more of Aspects 1-24.

Aspect 26: An apparatus comprising means for performing one or more operations recited in one or more of Aspects 1-24.

Aspect 27: A non-transitory computer-readable medium storing a set of instructions, the set of instructions comprising one or more instructions that, when executed by a device, cause the device to perform one or more operations recited in one or more of Aspects 1-24.

Aspect 28: A computer program product comprising instructions or code for executing one or more operations recited in one or more of Aspects 1-24.

The foregoing disclosure provides illustration and description, but is not intended to be exhaustive or to limit the implementations to the precise form disclosed. Modifications and variations are possible in light of the above disclosure or may be acquired from practice of the implementations.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. An ultrasonic touch sensor, comprising:
   a housing having an ultrasound chamber;
   a touch structure comprising a touch surface configured to receive a touch, wherein the touch structure is coupled to the housing and arranged over the ultrasound chamber, and wherein the touch structure comprises a touch interface at the touch surface;
   a first signal generator configured to:
      generate a first excitation signal for producing a first ultrasonic transmit wave, and
      generate a second excitation signal for producing a second ultrasonic transmit wave;
   a first ultrasonic transmitter, arranged within the ultrasound chamber, configured to:
      receive the first excitation signal, and
      transmit the first ultrasonic transmit wave toward the touch structure based on the first excitation signal;
   a second ultrasonic transmitter, arranged within the ultrasound chamber and different from the first ultrasonic transmitter, configured to:
      receive the second excitation signal, and
      transmit the second ultrasonic transmit wave toward the touch structure based on the second excitation signal;
   a first ultrasonic receiver, arranged within the ultrasound chamber, configured to:
      receive a first ultrasonic reflected wave produced by a reflection of the first ultrasonic transmit wave, and
      generate a first measurement signal representative of the first ultrasonic reflected wave;
   a second ultrasonic receiver, arranged within the ultrasound chamber and different from the first ultrasonic receiver, configured to:
      receive a second ultrasonic reflected wave produced by a reflection of the second ultrasonic transmit wave, and
      generate a second measurement signal representative of the second ultrasonic reflected wave; and
   a measurement circuit, coupled to the first ultrasonic receiver and the second ultrasonic receiver, configured to:
      measure a difference between the first measurement signal and the second measurement signal,
      perform a comparison based on the difference between the first measurement signal and the second measurement signal and a first detection threshold, and
      determine whether a no-touch event or a touch event has occurred at the touch surface based on whether the difference between the first measurement signal and the second measurement signal satisfies the first detection threshold.

2. The ultrasonic touch sensor of claim 1, wherein, to detect whether the no-touch event or a touch event has occurred at the touch surface, the measurement circuit is configured to:
   detect the touch event based on the difference between the first measurement signal and the second measurement signal being less than the first detection threshold, or
   detect the no-touch event based on the difference between the first measurement signal and the second measurement signal being equal to or greater than the first detection threshold.

3. The ultrasonic touch sensor of claim 1, wherein the measurement circuit is further configured to:
   measure the first measurement signal during a first observation window to generate a first measurement, wherein the first observation window corresponds to a first time interval during which the first ultrasonic reflected wave is expected to be received by the first ultrasonic receiver if water is present on the touch surface, and
   measure the second measurement signal during a second observation window to generate a second measurement, wherein the second observation window corresponds to a second time interval during which the second ultrasonic reflected wave is expected to be received by the second ultrasonic receiver if the water is present on the touch surface, and
   wherein the difference between the first measurement signal and the second measurement signal is a difference between the first measurement and the second measurement.

4. The ultrasonic touch sensor of claim 3, wherein the first signal generator is further configured to:
   generate the first excitation signal in a first measurement frame and generate the second excitation signal in a second measurement frame that is subsequent to the first measurement frame, and
   wherein the first observation window is part of the first measurement frame and the second observation window is part of the second measurement frame.

5. The ultrasonic touch sensor of claim 1, wherein the measurement circuit is further configured to:
   acquire a first plurality of digital samples of the first measurement signal,
   calculate a first distance value of the first plurality of digital samples relative to a reference signal,
   acquire a second plurality of digital samples of the second measurement signal,
   calculate a second distance value of the second plurality of digital samples relative to the reference signal, and
   calculate a difference between the first distance value and the second distance value as the difference between the first measurement signal and the second measurement signal.

6. The ultrasonic touch sensor of claim 1, wherein the measurement circuit is further configured to:

measure a function of an amplitude of the first measurement signal to generate a first measured value, measure a function of an amplitude of the second measurement signal to generate a second measured value, and calculate a difference between the first measured value and the second measured value as the difference between the first measurement signal and the second measurement signal.

7. The ultrasonic touch sensor of claim 1, wherein the first signal generator is further configured to generate the first excitation signal in a first measurement frame and generate the second excitation signal in a second measurement frame subsequent to the first measurement frame.

8. The ultrasonic touch sensor of claim 7, further comprising:

a first ultrasonic transceiver configured as the first ultrasonic transmitter during the first measurement frame and as the second ultrasonic receiver during the second measurement frame; and a second ultrasonic transceiver configured as the first ultrasonic receiver during the first measurement frame and as the second ultrasonic transmitter during the second measurement frame.

9. The ultrasonic touch sensor of claim 1, wherein, to determine whether the no-touch event or the touch event has occurred at the touch surface, the measurement circuit is configured to:

measure the first measurement signal during a first observation window that corresponds to the first ultrasonic reflected wave produced by a reflection of the first ultrasonic transmit wave at the touch interface to generate a first measurement, compare the first measurement with a second detection threshold, detect the touch event based on whether the first measurement satisfies the second detection threshold, measure the first measurement signal during a second observation window that is subsequent in time to the first observation window to generate a second measurement, measure the second measurement signal during a third observation window that is subsequent in time to the second observation window to generate a third measurement, calculate a difference between the second measurement and the third measurement as the difference between the first measurement signal and the second measurement signal, and determine whether the touch event is an actual touch event or a false touch event based on whether the difference between the second measurement and the third measurement satisfies the first detection threshold.

10. The ultrasonic touch sensor of claim 9, wherein, to determine whether the touch event is the actual touch event or the false touch event, the measurement circuit is configured to:

determine that the touch event is the actual touch event based on the difference between the second measurement and the third measurement being less than the first detection threshold, or determine that the touch event is the false touch event based on the difference between the second measurement and the third measurement being equal to or greater than the first detection threshold.

11. The ultrasonic touch sensor of claim 9, wherein the first observation window corresponds to a first time interval during which the first ultrasonic reflected wave is expected to be received by the first ultrasonic receiver from the reflection of the first ultrasonic transmit wave at the touch interface, wherein the second observation window corresponds to a second time interval during which the first ultrasonic reflected wave is expected to be received by the first ultrasonic receiver if water is present on the touch surface, and wherein the third observation window corresponds to a third time interval during which the second ultrasonic reflected wave is expected to be received by the second ultrasonic receiver if the water is present on the touch surface.

12. An ultrasonic touch sensor, comprising:

a housing having an ultrasound chamber;

a touch structure, coupled to the housing and arranged over the ultrasound chamber, comprising:

a touch surface configured to receive a touch, and a touch interface at the touch surface;

a signal generator configured to generate an excitation signal for producing an ultrasonic transmit wave;

an ultrasonic transmitter, arranged within the ultrasound chamber, configured to:

receive the excitation signal, and transmit the ultrasonic transmit wave toward the touch structure based on the excitation signal;

a plurality of ultrasonic receivers, arranged within the ultrasound chamber, configured to:

receive a plurality of reflections of the ultrasonic transmit wave, and generate a plurality of measurement signals representative of the plurality of reflections, wherein each ultrasonic receiver of the plurality of ultrasonic receivers is configured to generate a respective measurement signal of the plurality of measurement signals; and a measurement circuit, coupled to the plurality of ultrasonic receivers, configured to:

measure a degree of variation of the plurality of measurement signals, compare the degree of variation with a first detection threshold, and determine whether a no-touch event or a touch event has occurred at the touch surface based on whether the degree of variation satisfies the first detection threshold.

13. The ultrasonic touch sensor of claim 12, wherein, to determine whether the no-touch event or the touch event has occurred at the touch surface, the measurement circuit is configured to:

detect the touch event based on the degree of variation being less than the first detection threshold, or detect the no-touch event based on the degree of variation being equal to or greater than the first detection threshold.

14. The ultrasonic touch sensor of claim 12, wherein the ultrasonic transmitter is an ultrasonic transceiver configurable into a transmission mode for transmitting the ultrasonic transmit wave and configurable into a receiving mode as one of the plurality of ultrasonic receivers to receive a respective reflection, and wherein the ultrasonic transceiver is configured into the receiving mode after transmitting the ultrasonic transmit wave.

15. The ultrasonic touch sensor of claim 12, wherein the plurality of ultrasonic receivers includes:

a first ultrasonic receiver configured to:
  receive a first reflection of the plurality of reflections, and
  generate a first measurement signal representative of the first reflection, and
a second ultrasonic receiver configured to:
  receive a second reflection of the plurality of reflections, and
  generate a second measurement signal representative of the second reflection, and
wherein, to determine whether the no-touch event or the touch event has occurred at the touch surface, the measurement circuit configured to:
  measure a difference between the first measurement signal and the second measurement signal,
  perform a comparison based on the difference between the first measurement signal and the second measurement signal and the first detection threshold, and
  determine whether the no-touch event or the touch event has occurred at the touch surface based on whether the difference between the first measurement signal and the second measurement signal satisfies the first detection threshold.

16. The ultrasonic touch sensor of claim 15, wherein the measurement circuit is further configured to:
  acquire a first plurality of digital samples of the first measurement signal,
  calculate a first distance value of the first plurality of digital samples relative to a reference signal,
  acquire a second plurality of digital samples of the second measurement signal,
  calculate a second distance value of the second plurality of digital samples relative to the reference signal, and
  calculate a difference between the first distance value and the second distance value as the difference between the first measurement signal and the second measurement signal.

17. The ultrasonic touch sensor of claim 15, wherein the measurement circuit is further configured to:
  measure a function of an amplitude of the first measurement signal to generate a first measured value,
  measure a function of an amplitude of the second measurement signal to generate a second measured value, and
  calculate a difference between the first measured value and the second measured value as the difference between the first measurement signal and the second measurement signal.

18. The ultrasonic touch sensor of claim 12, wherein the measurement circuit is further configured to:
  measure the plurality of measurement signals during an observation window that corresponds to a time interval during which the plurality of reflections are expected to be received by the plurality of ultrasonic receivers if water is present on the touch surface.

19. The ultrasonic touch sensor of claim 12, wherein the plurality of ultrasonic receivers are offset from a lateral side of the ultrasonic transmitter.

20. The ultrasonic touch sensor of claim 12, wherein the plurality of ultrasonic receivers are offset from two or more lateral sides of the ultrasonic transmitter.

21. The ultrasonic touch sensor of claim 12, wherein, to determine whether the no-touch event or the touch event has occurred at the touch surface, the measurement circuit is configured to:
  measure a first measurement signal of the plurality of measurement signals during a first observation window to generate a first measurement, wherein the first observation window corresponds to an initial reflection of the ultrasonic transmit wave produced at the touch interface,
  compare the first measurement with a second detection threshold,
  detect the touch event based on whether the first measurement satisfies the second detection threshold,
  measure the plurality of measurement signals during a second observation window that is subsequent in time to the first observation window to generate a plurality of second measurements, wherein each second measurement of the plurality of second measurements corresponds to a respective measurement signal of the plurality of measurement signals,
  measure the degree of variation of the plurality of second measurements as the degree of variation of the plurality of measurement signals, and
  determine whether the touch event is an actual touch event or a false touch event based on whether the degree of variation of the plurality of second measurements satisfies the first detection threshold.

22. The ultrasonic touch sensor of claim 21, wherein, to determine whether the touch event is the actual touch event or the false touch event, the measurement circuit is configured to:
  determine that the touch event is the actual touch event based on the degree of variation of the plurality of second measurements being less than the first detection threshold, or
  determine that the touch event is the false touch event based on the degree of variation of the plurality of second measurements being equal to or greater than the first detection threshold.

23. The ultrasonic touch sensor of claim 21, wherein the first observation window corresponds to a first time interval during which the initial reflection is expected to be received by the plurality of ultrasonic receivers, and
  wherein the second observation window corresponds to a second time interval during which the plurality of reflections are expected to be received by the plurality of ultrasonic receivers if water is present on the touch surface.

24. A method, comprising:
  transmitting, by an ultrasonic transmitter, an ultrasonic transmit wave toward a touch structure of an ultrasonic touch sensor;
  receiving, by each of a plurality of ultrasonic receivers, a plurality of reflections of the ultrasonic transmit wave;
  generating, by each of the plurality of ultrasonic receivers, a plurality of measurement signals representative of the plurality of reflections;
  measuring, by a measurement circuit, a degree of variation of the plurality of measurement signals;
  comparing, by the measurement circuit, the degree of variation with a detection threshold; and
  determining, by the measurement circuit, whether a no-touch event or a touch event has occurred at the touch structure based on whether the degree of variation satisfies the detection threshold.

* * * * *